(12) United States Patent
Tanaka et al.

(10) Patent No.: US 6,782,006 B1
(45) Date of Patent: Aug. 24, 2004

(54) DIGITAL BROADCASTING APPARATUS WHICH ADJUSTS BITRATES OF SOURCE DATA ITEMS COMPOSING ADDITIONAL INFORMATION

(75) Inventors: Akihiro Tanaka, Moriguchi (JP); Takashi Kakiuchi, Toyonaka (JP); Toshiya Mori, Settsu (JP); Junichi Hirai, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 781 days.

(21) Appl. No.: 09/583,685

(22) Filed: May 31, 2000

(30) Foreign Application Priority Data

Jun. 11, 1999 (JP) .......................................... 11-164919
Nov. 12, 1999 (JP) .......................................... 11-323313

(51) Int. Cl.[7] .............................. H04J 3/16; H04J 3/02
(52) U.S. Cl. ...................................... 370/468; 370/538
(58) Field of Search ................................ 370/230, 231, 370/235, 468, 442–443, 535–537, 538, 540, 545; 375/240.01; 348/385.1, 423.1; 729/231; 382/282

(56) References Cited

U.S. PATENT DOCUMENTS 5,577,258 A * 11/1996 Cruz et al. .................. 709/219
5,793,425 A * 8/1998 Balakrishnan .............. 370/537
6,252,990 B1 * 6/2001 Senda ......................... 725/151
6,542,518 B1 * 4/2003 Miyazawa .................. 370/468

FOREIGN PATENT DOCUMENTS

EP                823823         *   2/1997

\* cited by examiner

*Primary Examiner*—Steven Nguyen

(57) ABSTRACT

A digital broadcasting apparatus includes: a bitrate storage unit for holding a bitrate set for each source data item and a total bitrate available for transmitting source data items; a transmission period storage unit for holding transmission time period of each source data item; a source data reading unit for reading each source data item to be transmitted from a source data storage unit; a rate control unit for calculating a transmission bitrate of each source data item that should be simultaneously transmitted according to predetermined equations; and a data multiplexing unit for multiplexing each source data item read by the source data reading unit into a transport stream at the transmission bitrate calculated by the rate control unit.

21 Claims, 25 Drawing Sheets

FIG. 2

201 SOURCE INFORMATION

| SOURCE NAME | CAROUSEL LIST | TRANSMISSION PERIOD | MODULE LIST | MODULE SIZE | MODULE PRIORITY |
|---|---|---|---|---|---|
| SOURCE A | CAROUSEL 1 | FIVE MINUTES | MODULE 1a | 30kbit | 5 |
| | | | MODULE 1b | 20kbit | 10 |
| | | | MODULE 1c | 40kbit | 20 |
| | | | MODULE 1d | 10kbit | 25 |
| | CAROUSEL 2 | FIVE MINUTES | MODULE 2a | 10kbit | 5 |
| | | | MODULE 2b | 10kbit | 15 |
| | | | MODULE 2c | 20kbit | 15 |
| | | | MODULE 2d | 10kbit | 25 |
| | CAROUSEL 3 | TEN MINUTES | MODULE 3a | 20kbit | 5 |
| | | | MODULE 3b | 30kbit | 20 |
| | | | MODULE 3c | 25kbit | 10 |
| ⋮ | ⋮ | ⋮ | ⋮ | ⋮ | ⋮ |

FIG. 5

| TOTAL BITRATE |
|---|
| 2000kbit/sec |

| SOURCE NAME | INITIAL BITRATE |
|---|---|
| SOURCE A | 125kbit/sec |
| SOURCE B | 100kbit/sec |
| SOURCE C | 500kbit/sec |
| ⋮ | ⋮ |

TRANSMISSION SCHEDULE MANAGEMENT UNIT 105

SCHEDULE INFORMATION 701

| SOURCE NAME | TRANSMISSION START TIME | TRANSMISSION END TIME | PID |
|---|---|---|---|
| SOURCE A | 1999/01/01 10:00:00 | 1999/01/01 10:20:00 | 0x100 |
| SOURCE B | 1999/01/01 10:00:00 | 1999/01/01 10:30:00 | 0x200 |
| SOURCE A | 1999/01/01 10:30:00 | 1999/01/01 10:50:00 | 0x300 |
| ⋮ | ⋮ | ⋮ | ⋮ |

FIG. 9

TOTAL BITRATE TABLE 901

| START TIME | END TIME | TOTAL INITIAL BITRATE |
|---|---|---|
| 1999/01/01 10:00:00 | 1999/01/01 10:20:00 | 225kbit/sec |
| 1999/01/01 10:20:00 | 1999/01/01 10:30:00 | 100kbit/sec |
| 1999/01/01 10:30:00 | 1999/01/01 10:45:00 | 500kbit/sec |

FIG. 11

TRANSMISSION SOURCE INFORMATION 1101

| SOURCE NAME | CAROUSEL NAME | TRANSMISSION STREAM INFORMATION | TRANSMISSION BITRATE | TRANSMISSION COUNTER |
|---|---|---|---|---|
| SOURCE A | CAROUSEL 2 | PID = 0x100 | 1012.5 kbit/sec | 14.81 |
| SOURCE B | CAROUSEL B1 | PID = 0x200 | 987.5 kbit/sec | 14.18 |

1102  1103  1104  1105  1106

FIG. 13A  MODULE STEP TABLE 1301

| MODULE NAME | TRANSMISSION STEP NUMBER |
|---|---|
| MODULE 1a | 0 |
| MODULE 1b | 0 |
| MODULE 1c | 0 |
| MODULE 1d | 0 |

FIG. 13B

| MODULE NAME | TRANSMISSION STEP NUMBER |
|---|---|
| MODULE 1a | 5 |
| MODULE 1b | 0 |
| MODULE 1c | 0 |
| MODULE 1d | 0 |

FIG. 13C

| MODULE NAME | TRANSMISSION STEP NUMBER |
|---|---|
| MODULE 1a | 105 |
| MODULE 1b | 110 |
| MODULE 1c | 120 |
| MODULE 1d | 100 |

FIG. 13D

| MODULE NAME | TRANSMISSION STEP NUMBER |
|---|---|
| MODULE 1a | 105 |
| MODULE 1b | 110 |
| MODULE 1c | 120 |
| MODULE 1d | 125 |

FIG. 17

| TOTAL BITRATE |
|---|
| 2000 kbit/sec |

| SOURCE NAME | INITIAL TRANSMISSION CYCLE |
|---|---|
| SOURCE A | 1 sec/cycle |
| SOURCE B | 2 sec/cycle |
| SOURCE C | 1.5 sec/cycle |
| ⋮ | ⋮ |

FIG. 18

SCHEDULE INFORMATION 1801

| SOURCE NAME | CAROUSEL NAME | TRANSMISSION START TIME | TRANSMISSION END TIME | PID |
|---|---|---|---|---|
| SOURCE A | CAROUSEL 1 | 1999/01/01 10:00:00 | 1999/01/01 10:05:00 | 0x100 |
| SOURCE B | CAROUSEL B1 | 1999/01/01 10:00:00 | 1999/01/01 10:10:00 | 0x200 |
| SOURCE A | CAROUSEL 2 | 1999/01/01 10:05:00 | 1999/01/01 10:10:00 | 0x100 |
| SOURCE A | CAROUSEL 3 | 1999/01/01 10:10:00 | 1999/01/01 10:20:00 | 0x100 |
| SOURCE B | CAROUSEL B2 | 1999/01/01 10:10:00 | 1999/01/01 10:20:00 | 0x200 |
| SOURCE B | CAROUSEL B3 | 1999/01/01 10:20:00 | 1999/01/01 10:30:00 | 0x200 |
| ... | ... | ... | ... | ... |

| SOURCE NAME | CAROUSEL NAME | INITIAL BITRATE |
|---|---|---|
| SOURCE A | CAROUSEL 1 | 312 kbit/sec |
| | CAROUSEL 2 | ... |
| | CAROUSEL 3 | ... |
| ⋮ | ⋮ | ⋮ |

FIG. 21

SCHEDULE INFORMATION 2101

| SOURCE NAME | TRANSMISSION START TIME | TRANSMISSION END TIME | BITRATE | PID |
|---|---|---|---|---|
| SOURCE A | 1999/01/01 10:00:00 | 1999/01/01 10:20:00 | 125kbit/sec | 0x100 |
| SOURCE B | 1999/01/01 10:00:00 | 1999/01/01 10:30:00 | 100kbit/sec | 0x200 |
| SOURCE A | 1999/01/01 10:30:00 | 1999/01/01 10:50:00 | 200kbit/sec | 0x300 |
| ... | ... | ... | ... | ... |

| TOTAL BITRATE |
|---|
| 2000kbit/sec |

| SOURCE NAME | CAROUSEL NAME | INITIAL BITRATE |
|---|---|---|
| SOURCE A | CAROUSEL 1 | 125kbit/sec |
|  | CAROUSEL 2 | 100kbit/sec |
|  | CAROUSEL 3 | 200kbit/sec |
| SOURCE B | CAROUSEL B1 | 100kbit/sec |
|  | CAROUSEL B2 | 100kbit/sec |
|  | CAROUSEL B3 | 150kbit/sec |
| SOURCE C | CAROUSEL C1 | 500kbit/sec |
|  | CAROUSEL C2 | 450kbit/sec |
|  | CAROUSEL C3 | 700kbit/sec |
| ⋮ | ⋮ | ⋮ |

FIG. 23

| TOTAL BITRATE |
|---|
| 2000kbit/sec |

| SOURCE NAME | INITIAL BITRATE ~2301 | MINIMUM BITRATE ~2302 | MAXIMUM BITRATE ~2303 | TRANSMISSION PRIORITY ~2304 |
|---|---|---|---|---|
| SOURCE A | 125kbit/sec | 100kbit/sec | 1000kbit/sec | 100 |
| SOURCE B | 100kbit/sec | 50kbit/sec | 1000kbit/sec | 50 |
| SOURCE C | 500kbit/sec | 350kbit/sec | 2000kbit/sec | 100 |
| ... | ... | ... | ... | ... |

FIG. 27

SCHEDULE INFORMATION 2701

| SOURCE NAME | CAROUSEL NAME | TRANSMISSION START TIME | TRANSMISSION END TIME | INITIAL BITRATE | PID |
|---|---|---|---|---|---|
| SOURCE A | CAROUSEL 1 | 1999/01/01 10:00:00 | 1999/01/01 10:05:00 | 125kbit/sec | 0x100 |
| SOURCE B | CAROUSEL B1 | 1999/01/01 10:00:00 | 1999/01/01 10:10:00 | 100kbit/sec | 0x200 |
| SOURCE A | CAROUSEL 2 | 1999/01/01 10:05:00 | 1999/01/01 10:10:00 | 150kbit/sec | 0x100 |
| SOURCE A | CAROUSEL 3 | 1999/01/01 10:10:00 | 1999/01/01 10:20:00 | 130kbit/sec | 0x100 |
| SOURCE B | CAROUSEL B2 | 1999/01/01 10:10:00 | 1999/01/01 10:20:00 | 80kbit/sec | 0x200 |
| SOURCE B | CAROUSEL B3 | 1999/01/01 10:20:00 | 1999/01/01 10:30:00 | 100kbit/sec | 0x200 |
| ... | ... | ... | ... | ... | ... |

2702

DIGITAL BROADCASTING APPARATUS WHICH ADJUSTS BITRATES OF SOURCE DATA ITEMS COMPOSING ADDITIONAL INFORMATION

This application is based on application Nos. H11-164919 and H11-323313 filed in Japan, the content of which is hereby incorporated by reference.

BACKGROUND OF THE INVENTION

1. Field of the Invention

The present invention relates to a digital broadcasting apparatus, and in particular to a digital broadcasting apparatus that adjusts bitrates assigned to source data items which compose additional information and are sent along with video and audio data of a broadcast program.

2. Background Art

As digital broadcasting has become more common in recent years, more and more additional information is being multiplexed and broadcasted with broadcast programs. The bitrate necessary to send each source data item composing the additional information depends on the nature of the source data item. Note that source data in this specification refers to data that composes information transmitted in addition to broadcast programs, and includes a plurality of source data items. Japanese Laid-Open Patent Application No. H10-304325, for instance, discloses a method for calculating the bitrate of each source data item from the size of the source data item.

With conventional methods, however, once a bitrate is determined for a source data item, the bitrate cannot be changed. This causes problems if the broadcast time is extended and the number of source data items to be sent changes. More specifically, if more source data items need to be sent, all source data items may not fit into the bandwidth reserved for source data. On the other hand, when source data items are deleted, the reserved bandwidth will not be used efficiently.

SUMMARY OF THE INVENTION

In view of the stated problems, the object of the present invention is to provide a digital broadcasting apparatus that adjusts the bitrate of each source data piece to efficiently use a bandwidth reserved for source data even if the number of source data pieces to be sent changes.

The stated object is achieved by a digital broadcasting apparatus that multiplexes a plurality of source data pieces into a transport stream of video and audio data of a broadcast program and transmits the transport stream to a receiving apparatus, the digital broadcasting apparatus including: a source data storage unit for storing the plurality of source data pieces; a bitrate storage unit for storing information that shows a bitrate for each source data piece and a total bitrate available for transmitting the plurality of source data pieces; a transmission period storage unit for storing a transmission start time and transmission end time of each source data piece; a bitrate assigning unit for assigning, before the current time reaches each transmission start time and transmission end time in the transmission period storage unit, a transmission bitrate to each source data piece according to the information in the bitrate storage unit so that a sum of the transmission bitrates is no more than the total bitrate; a source data reading unit for reading, from the source data storage unit, each source data piece whose transmission start time matches the current time; a multiplexing unit for (1) holding each source data piece read by the source data reading unit between the transmission start time and transmission end time thereof, and (2) repeatedly multiplexing each held source data piece into the transport stream according to the transmission bitrate assigned to the held source data piece; and a transmission unit for transmitting the transport stream into which each held source data piece has been multiplexed by the multiplexing unit.

With this construction, the digital broadcasting apparatus of the present invention efficiently uses a bandwidth reserved for source data by flexibly adjusting the transmission bitrate of each source data piece according to the time when the source data piece is transmitted. This allows the receiving apparatus that receives digital broadcasts to efficiently receive and use the source data pieces.

Here, the bitrate assigning unit may include: a sum calculation unit for calculating a sum of the bitrates for transmission pieces, the transmission pieces being source data pieces to be simultaneously transmitted; a judging unit for judging whether the sum calculated by the sum calculation unit exceeds the total bitrate; a first calculation unit for calculating, if a judgement result by the judging unit is negative, the transmission bitrate of each transmission piece according to a first equation; and a second calculation unit for calculating, if a judgement result by the judging unit is affirmative, the transmission bitrate of each transmission piece according to a second equation.

With this construction, the digital broadcasting apparatus assigns a transmission bitrate to each source data piece so that the bandwidth reserved for transmitting source data pieces is efficiently used.

Here, according to the first equation, a certain portion of a difference between the total bitrate and the sum calculated by the sum calculation unit may be added to the bitrate for each transmission piece, according to the second equation, a certain portion of a difference between the total bitrate and the sum calculated by the sum calculation unit may be subtracted from the bitrate for each transmission piece, and the bitrate assigning unit may further include a recalculation unit for (3) setting at "0" the transmission bitrate of each transmission piece whose transmission bitrate calculated by the second calculation unit was "0" or less and (4) recalculating the transmission bitrates of the other transmission pieces.

With this construction, even if the transmission of some source data pieces has become impossible, the digital broadcasting apparatus efficiently transmits other source data pieces.

Here, instead of each transmission piece whose transmission bitrate was set at "0" by the recalculation unit, the multiplexing unit may multiplex message data, that is assigned a low transmission bitrate and shows that transmission of the transmission piece has been canceled, into the transport stream.

With this construction, the digital broadcasting apparatus informs a user that the transmission of some source data pieces has been canceled.

Here, according to the first equation, a certain portion of a difference between the total bitrate and the sum calculated by the sum calculation unit may be added to the bitrate for each transmission piece, according to the second equation, a certain portion of a difference between the total bitrate and the sum calculated by the sum calculation unit may be subtracted from the bitrate for each transmission piece, the bitrate storage unit may further store a minimum bitrate and a maximum bitrate of each source data piece, the minimum bitrate of a source data piece being the lowest bitrate at which the receiving apparatus will be able to process the source data piece with sufficient speed, and the maximum bitrate of a source data piece being a bitrate above which no significant gain in speed at processing the source data piece will be able to be achieved for the receiving apparatus, the bitrate assigning unit may further include a transmission bitrate recalculation unit that (5), if there is at least one transmission piece whose transmission bitrate calculated by the second calculation unit is below the minimum bitrate thereof, sets the transmission bitrate of the at least one transmission piece at "0" and recalculates the transmission bitrates of the other transmission pieces according to the first equation, and (6), if there is at least one transmission piece whose transmission bitrate calculated by the second calculation unit is above the maximum bitrate thereof, sets the transmission bitrate of the at least one transmission piece as the maximum bitrate and recalculates the transmission bitrates of the other transmission pieces according to the second equation, and the multiplexing unit may multiplex each transmission piece into the transport stream according to the transmission bitrates set and recalculated by the transmission bitrate recalculation unit.

With this construction, the digital broadcasting apparatus assigns a transmission bitrate to each source data piece in consideration of the response time taken by the receiving apparatus.

Here, the bitrate for each source data piece in the bitrate storage unit may match a minimum bitrate of the source data piece, the minimum bitrate of a source data piece being the lowest bitrate at which the receiving apparatus will be able to process the source data piece with sufficient speed.

With this construction, the digital broadcasting apparatus prevents response time taken by the receiving apparatus from becoming too long during viewing of source data pieces.

Here, the digital broadcasting apparatus may further include a bitrate changing unit for changing the information in the bitrate storage unit.

This construction allows the transmission bitrate of each source data piece to be updated anytime.

Here, the digital broadcasting apparatus may further include a warning unit for issuing a warning to the outside if a ratio of the sum calculated by the sum calculation unit to the total bitrate exceeds a given threshold.

With this construction, the digital broadcasting apparatus informs an operator that problems may occur during the transmission of source data in certain time periods.

Here, each source data piece may include a plurality of modules, a priority being assigned to each module, and the source data reading unit may include: a reading order determining unit for determining an order for reading each module of each source data piece according to the priority of the module; and a module reading unit for reading data of each module in predetermined units according to the determined order.

With this construction, the digital broadcasting apparatus first transmits modules having higher priorities. Also, the receiving apparatus processes modules having higher priorities at high speed. This achieves the efficient use of source data pieces.

Here, each source data piece may include a plurality of modules, a transmission bitrate being set for each specific module and a priority being assigned to each non-specific module except for the specific module, and the digital broadcasting apparatus may further include a priority calculation unit for calculating a priority of each specific module from the transmission bitrate of a source data piece including the specific module, the transmission bitrate set for the specific module, and the priority assigned to each non-specific module included in the source data piece.

With this construction, the digital broadcasting apparatus calculates the priority of each specific module for which a transmission bitrate is preset, with regard to the priority of each non-specific module. In this manner, the digital broadcasting apparatus sets the transmission bitrate of each specific module as the preset transmission bitrate.

Here, if a source data piece includes one specific module, the priority calculation unit may calculate the priority of the specific module according to Equation 1

$$\text{BITRATE} = \frac{\frac{1}{x}}{\frac{1}{x} + \sum_n \frac{1}{\text{PRIORITY OF MODULE } n}} \times \text{CAROUSEL} \quad \text{Equation 1}$$

$$\text{BITRATE} = \frac{\text{TRANSMISSION BITRATE OF}}{\text{SPECIFIC MODULE}}$$

where x refers to the priority of the specific module and the module n refers to a non-specific module included in the source data piece.

With this construction, the digital broadcasting apparatus appropriately calculates the priority of the specific module for which a transmission bitrate is preset.

Here, the source data reading unit may include: a reading order determining unit for determining an order for reading each module of each source data piece according to the priority of the module; and a module reading unit for reading data of each module in predetermined units according to the determined order.

With this construction, the digital broadcasting apparatus first transmits modules having higher priorities, with each specific module being transmitted at the preset transmission bitrate.

Here, if a source data piece includes a plurality of specific modules, the priority calculation unit may calculate the priority of each specific module according to Simultaneous Equations 2

$$\left. \begin{array}{l} \dfrac{\frac{1}{x_1}}{\frac{1}{x_1} + \frac{1}{x_2} + \ldots + \frac{1}{x_i} + \sum_n \frac{1}{Pr(n)}} \times Cbr = br(1) \\[2ex] \dfrac{\frac{1}{x_2}}{\frac{1}{x_1} + \frac{1}{x_2} + \ldots + \frac{1}{x_i} + \sum_n \frac{1}{Pr(n)}} \times Cbr = br(2) \\[2ex] \vdots \\[1ex] \dfrac{\frac{1}{x_i}}{\frac{1}{x_1} + \frac{1}{x_2} + \ldots + \frac{1}{x_i} + \sum_n \frac{1}{Pr(n)}} \times Cbr = br(i) \end{array} \right\}$$

where $x_i$ refers to the priority of a specific module, $Pr(n)$ refers to the priority assigned to a non-specific module included in the source data piece, $Cbr$ refers to the transmission bitrate of the source data piece, and $br(i)$ refers to the transmission bitrate set for the specific module.

With this construction, even if there are a plurality of specific modules for which transmission bitrates are preset, the digital broadcasting apparatus calculates the priority of each specific module.

Here, each source data piece may include a plurality of modules, a transmission bitrate being set for each specific module and a priority being assigned to each non-specific module except for the specific module, the bitrate assigning unit may include a remaining bitrate assigning unit for obtaining a remaining bitrate by subtracting a sum of the transmission bitrates set for each specific module included in a source data piece from the transmission bitrate of the source data piece and setting a portion of the remaining bitrate as a transmission bitrate of each non-specific module included in the source data piece, the source data reading unit may include: a first reading unit for reading data of each specific module in predetermined units; a reading order determining unit for determining an order for reading each non-specific module according to the priority of the non-specific module; and a second reading unit for reading data of each non-specific module in predetermined units according to the determined order, and the multiplexing unit may include a module data multiplexing unit for (7) multiplexing data of each specific module read by the first reading unit into the transport stream according to the transmission bitrate set for the specific module and (8) multiplexing data of each non-specific module read by the second reading unit into the transport stream according to the transmission bitrate of the non-specific module set by the remaining bitrate assigning unit.

With this construction, the digital broadcasting apparatus multiplexes data of each specific module into the transport stream at the preset transmission bitrate and data of each non-specific module according to the priority of the non-specific module.

Here, if at least one source data piece that is currently transmitted by the transmission unit is updated, the bitrate assigning unit reassigns a transmission bitrate to each currently transmitted source data piece according to the information in the bitrate storage unit.

With this construction, even if source data pieces that are currently transmitted are updated suddenly, the digital broadcasting apparatus dynamically adjusts the transmission bitrate of each currently transmitted source data piece in real time. As a result, the bandwidth reserved for source data is efficiently used.

The stated object is also achieved by a digital broadcasting apparatus that multiplexes a plurality of source data pieces into a transport stream of video and audio data of a broadcast program and transmits the transport stream to a receiving apparatus, the digital broadcasting apparatus including: a source data storage unit for storing the plurality of source data pieces, each source data piece including at least one carousel which is each repeatedly sent as the source data piece for a predetermined time period; a bitrate storage unit for storing information that shows a bitrate for each carousel and a total bitrate available for transmitting the plurality of source data pieces; a transmission period storage unit for storing a transmission start time and transmission end time of each carousel; a bitrate assigning unit for assigning, before the current time reaches each transmission start time and transmission end time in the transmission period storage unit, a transmission bitrate to each carousel according to the information in the bitrate storage unit so that a sum of the transmission bitrates is no more than the total bitrate; a source data reading unit for reading, from the source data storage unit, each carousel whose transmission start time matches the current time; a multiplexing unit for (9) holding each carousel read by the source data reading unit between the transmission start time and transmission end time thereof, and (10) repeatedly multiplexing each held carousel into the transport stream according to the transmission bitrate assigned to the held carousel; and a transmission unit for transmitting the transport stream into which each held carousel has been multiplexed by the multiplexing unit.

With this construction, the digital broadcasting apparatus dynamically assigns a transmission bitrate to each carousel according to the time when the carousel is transmitted. As a result, the bandwidth reserved for source data is efficiently used.

Here, the bitrate assigning unit may include: an adding unit for calculating, if a sum of the bitrates for carousels to be simultaneously transmitted is below the total bitrate, the transmission bitrate of each of the carousels by adding a portion of a difference between the sum of the bitrates and the total bitrate to the bitrate for the carousel according to a size of the carousel; and a subtraction unit for calculating, if the sum of the bitrates for the carousels to be simultaneously transmitted exceeds the total bitrate, the transmission bitrate of each of the carousels by subtracting a portion of the difference between the sum of the bitrates and the total bitrate from the bitrate for the carousel according to a reciprocal of the size of the carousel.

With this construction, the digital broadcasting apparatus appropriately assigns a transmission bitrate to each carousel according to the size of the carousel.

The stated object is further achieved by a digital broadcasting apparatus that multiplexes a plurality of source data pieces into a transport stream of video and audio data of a broadcast program and transmits the transport stream to a receiving apparatus, the digital broadcasting apparatus including: a source data storage unit for storing the plurality of source data pieces, each source data piece including at least one carousel which is each repeatedly sent as the source data piece for a predetermined time period; a bitrate storage unit for storing information that shows a transmission cycle for each source data piece and a total bitrate available for transmitting the plurality of source data pieces; a transmission period storage unit for storing a transmission start time and transmission end time of each source data piece, and a transmission time period of each carousel; a set bitrate calculating unit for calculating a set bitrate of each carousel from the transmission cycle of a source data piece including the carousel and a size of the carousel; a bitrate assigning unit for (11) obtaining a transmission start time and transmission end time of each carousel from the information in the transmission period storage unit, and (12) assigning, before the current time reaches each transmission start time and transmission end time in the transmission period storage unit, a transmission bitrate to each carousel according to the set bitrate calculated for the carousel so that a sum of the transmission bitrates is no more than the total bitrate; a source data reading unit for reading, from the source data storage unit, each carousel whose transmission start time matches the current time; a multiplexing unit for (13) holding each carousel read by the source data reading unit between the transmission start time and transmission end time thereof, and (14) repeatedly multiplexing each held carousel into the transport stream according to the transmission bitrate assigned to the held carousel; and a transmission unit for transmitting the transport stream into which each held carousel has been multiplexed by the multiplexing unit.

With this construction, the digital broadcasting apparatus dynamically assigns a transmission bitrate to each carousel according to the time when the carousel is transmitted. When doing so, the digital broadcasting apparatus uses the transmission cycle that is preset for each source data piece in consideration of the response time taken by the receiving apparatus.

The object of the present invention is also achieved by a computer-readable recording medium that records a program and is applied to a digital broadcasting apparatus for multiplexing a plurality of source data pieces into a transport stream of video and audio data of a broadcast program and transmitting the transport stream to a receiving apparatus, the program having a computer of the digital broadcasting apparatus achieve the following units: a source data storage unit for storing the plurality of source data pieces; a bitrate storage unit for storing information that shows a bitrate for each source data piece and a total bitrate available for transmitting the plurality of source data pieces; a transmission period storage unit for storing a transmission start time and transmission end time of each source data piece; a bitrate assigning unit for assigning, before the current time reaches each transmission start time and transmission end time in the transmission period storage unit, a transmission bitrate to each source data piece according to the information in the bitrate storage unit so that a sum of the transmission bitrates is no more than the total bitrate; a source data reading unit for reading, from the source data storage unit, each source data piece whose transmission start time matches the current time; a multiplexing unit for (15) holding each source data piece read by the source data reading unit between the transmission start time and transmission end time thereof, and (16) repeatedly multiplexing each held source data piece into the transport stream according to the transmission bitrate assigned to the held source data piece; and a transmission unit for transmitting the transport stream into which each held source data piece has been multiplexed by the multiplexing unit.

The bandwidth reserved for source data is efficiently used by applying this computer-readable recording medium to a digital broadcasting apparatus that does not originally have the function for dynamically assigning a transmission bitrate to each source data piece in each transmission time period.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows an example of source information in a source data storage unit of the first embodiment;

FIG. 5 shows an example content of a bitrate storage unit of the first embodiment;

FIG. 9 shows a total bitrate table generated by a warning unit of the first embodiment;

FIG. 11 shows an example of transmission source information stored in a storage area of a source data reading unit of the first embodiment;

FIGS. 13A–13D show the transition state of a module step table generated by an intra-source rate control unit of the first embodiment;

FIG. 17 shows an example content of a bitrate storage unit of the second embodiment;

FIG. 18 shows an example of schedule information in a transmission schedule management unit of the second embodiment;

FIG. 20 shows an example of the initial bitrate of each carousel calculated by the transmission source judgement unit of the second embodiment;

FIG. 21 shows an example of schedule information in a transmission schedule management unit of the third embodiment;

FIG. 22 shows an example content of a bitrate storage unit of the fourth embodiment;

FIG. 23 shows an example content of a bitrate storage unit of the fifth embodiment;

FIG. 27 shows schedule information used in the case where the third embodiment is combined with the fourth embodiment.

DESCRIPTION OF THE PREFERRED EMBODIMENTS

Embodiments of a digital broadcasting apparatus of the present invention are described below with reference to the drawings. <First Embodiment>

Figure 1:
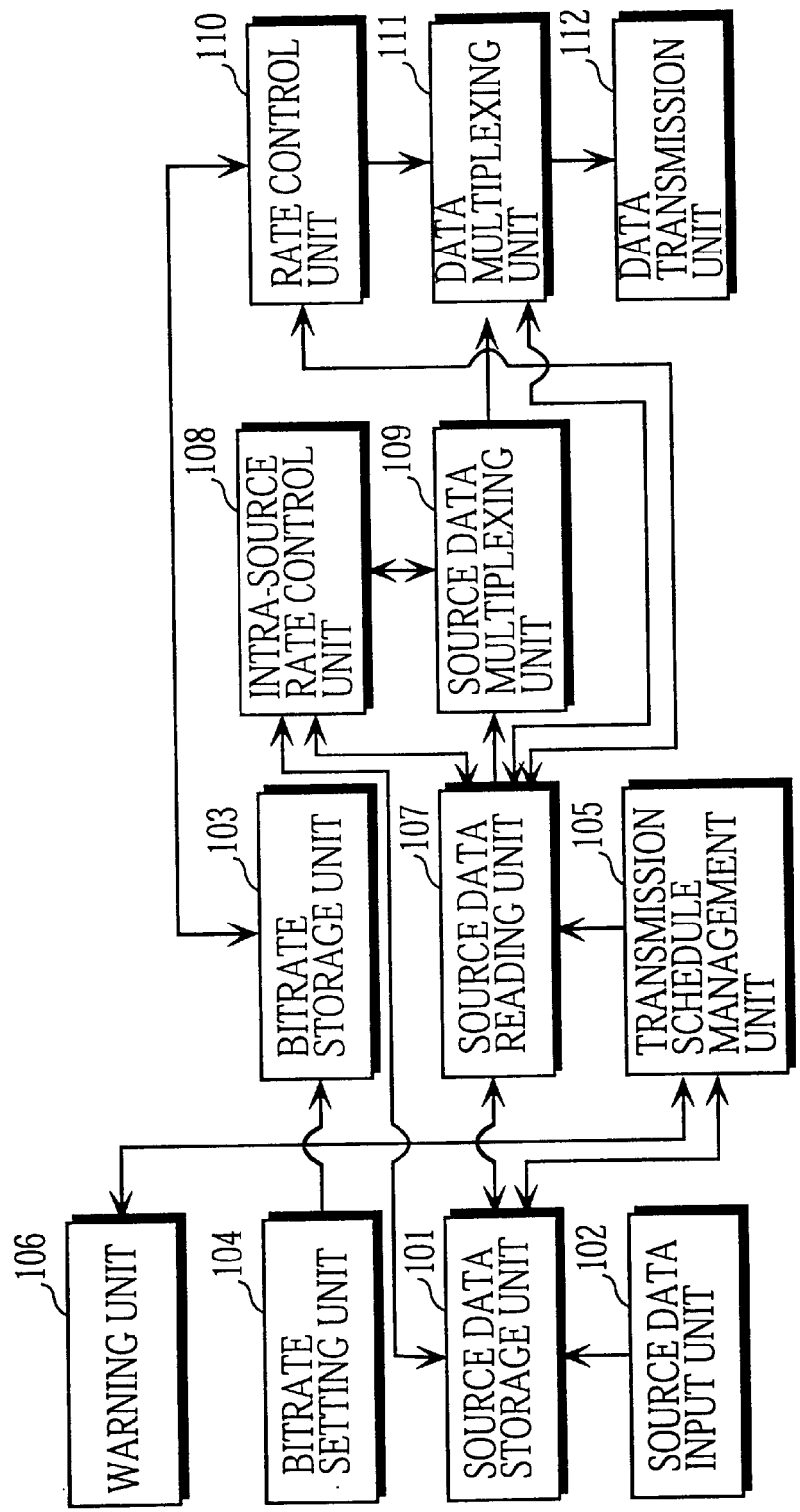
FIG. 1 is a block diagram of a digital broadcasting apparatus of the first embodiment.

FIG. 1 is a block diagram of a digital broadcasting apparatus of the first embodiment.

This digital broadcasting apparatus includes a source data storage unit 101, a source data input unit 102, a bitrate storage unit 103, a bitrate setting unit 104, a transmission schedule management unit 105, a warning unit 106, a rate control unit 110, an intra-source rate control unit 108, a source data reading unit 107, a source data multiplexing unit 109, a data multiplexing unit 111, and a data transmission unit 112.

The source data storage unit 101 includes a recording medium, such as a hard disc, and holds source data items and source information. The term "source data items" means data pieces that are additional information for broadcast programs and "source information" means various information concerning the source data items.

FIG. 2 shows an example of the source information (source information 201). As can be seen from this drawing, the source information 201 shows the construction of each source data item that is multiplexed into a transport stream with a broadcast program, and includes a source name column 202, a carousel list column 203, a transmission period column 204, a module list column 205, a module size column 206, and a module priority column 207.

The source name column 202 gives the name of each source data item to be sent.

The carousel list column 203 gives the name of each carousel. Each source data item is made up of at least one carousel, with a carousel being the source data item for a predetermined time period.

The transmission period column 204 shows how long each carousel should be sent.

The module list column 205 gives the name of each module. Here, each carousel includes at least one module.

The module size column 206 gives the size of each module in bits.

The module priority column 207 gives the transmission priority assigned to each module. Here, within a carousel, the transmission rate of each module is inversely proportional to the transmission priority of the module. That is, a module given a lower transmission priority will be sent at a higher transmission rate. The transmission rate of a module 1a is twice that of a module 1b, and four times that of a module 1c.

Any identifiers may be written in the source name column 202, the carousel name column 203, and the module list column 205, so long as each source data item, carousel, and module can be identified.

Figure 3:
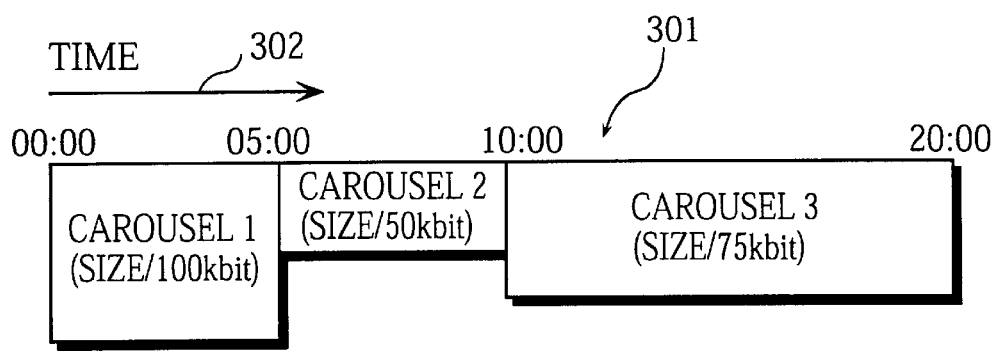
FIG. 3 shows a construction of a source data item shown in FIG. 2.

FIG. 3 shows an example construction of a source data item 301 having a source name "source A" in FIG. 2. As can be seen from this drawing, the source data item 301 includes a carousel 1, a carousel 2, and a carousel 3 along a time axis 302. As described above, each source data item includes at least one carousel, with the carousels being switched according to how much time has elapsed since the transmission start time of the source data item. In the case of the source data item 301, once the current time reaches the transmission start time of the source data item 301, the carousel 1 is transmitted for the first five minutes, the carousel 2 for the next five minutes, and the carousel 3 for the last ten minutes.

This carousel-based transmission method is suitable for a standard, such as MPEG2 (Moving Picture Experts Group 2) or DSM-CC (Digital Storage Media Command and Control).

Figure 4:
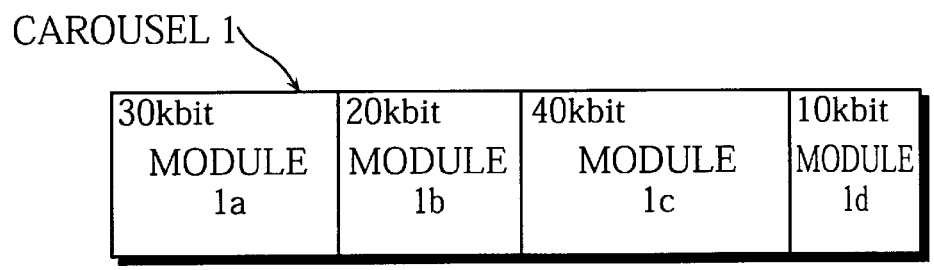
FIG. 4 shows a detailed structure of a carousel shown in FIG. 3.

FIG. 4 shows the detailed structure of the carousel 1. As shown in the module list column 205 in FIG. 2, the carousel 1 includes modules 1a, 1b, 1c, and 1d. The structure of each module conforms to a standard, such as MHEG (Multimedia and Hypermedia Information Coding Experts Group) or XML (Extensible Markup Language). In FIG. 4, a module size is written within the square representing the corresponding module, and the modules 1a, 1b, 1c, and 1d are respectively 30 kbit, 20 kbit, 40 kbit, and 10 kbit in size.

The source data input unit 102 has an external interface via which it obtains source data from an external source. The source data input unit 102 stores this source data into the source data storage unit 101. The source data input unit 102 also receives an input of the source information 201 from an operator and stores the source information 201 into the source data storage unit 101.

The bitrate storage unit 103 includes a RAM (random-access memory) and stores a total bitrate and some set bitrates. The total bitrate refers to the total bitrate reserved for source data and each set bitrate means a bitrate set for a source data item by the operator (hereinafter referred to as the "initial bitrate"). A bandwidth is assigned to each digital broadcast channel and each broadcast program is sent using the assigned bandwidth. Accordingly, when a broadcast program is sent using the bandwidth assigned to the broadcast program, the bandwidth shown by the total bitrate is available for transmitting source data.

FIG. 5 shows an example content of the bitrate storage unit 103, where the initial bitrate assigned to each source data item is written along with the corresponding source name. In this example, the total bitrate reserved for source data is 2000 kbit/sec and source data items named "source A", "source B", and "source C" have initial bitrates "125 kbit/sec", "100 kbit/sec", and "500 kbit/sec", respectively.

The bitrate setting unit 104 receives the total bitrate and the initial bitrate of each source data item from the operator and stores them into the bitrate storing unit 103.

The transmission schedule unit 105 manages the transmission schedule of source data items.

Figures 6, 7:
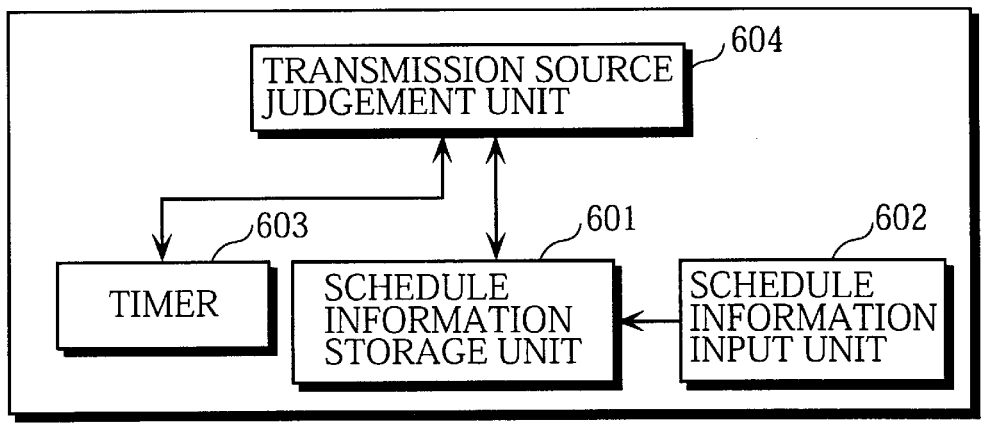
FIG. 6 shows a detailed block diagram of a transmission schedule management unit of the first embodiment.
FIG. 7 shows an example of schedule information in a schedule information storage unit of the first embodiment.

FIG. 6 shows a detailed block diagram of the transmission schedule management unit 105. The transmission schedule management unit 105 includes a schedule information storage unit 601, a schedule information input unit 602, a timer 603, and a transmission source judgement unit 604.

The schedule information storage unit 601 includes a RAM and holds schedule information concerning the transmission schedule of source data items. FIG. 7 shows an example of the schedule information (schedule information 701). As shown in this drawing, the schedule information 701 includes a source name column 702, a transmission start time column 703, a transmission end time column 704, and a PID column 705.

The source name column 702 gives the source name of each source data item.

The transmission start time column 703 gives a time to start the transmission of each source data item in the schedule information 701. The transmission end time column 704 gives a time to end the transmission of each source data item in this schedule information.

The PID column 705 shows a PID (packet identifier) assigned to the stream of each source data item.

The source data item named "source A" is, for instance, sent from 10:00 to 10:20 on Jan. 1, 1999 with a PID "0x100" and is sent from 10:30 to 10:50 on Jan. 1, 1999 with a PID "0x300".

The schedule information input unit 602 receives an input of the schedule information 701 from the operator via an external device and stores the schedule information into the schedule information storage unit 601. Note that the schedule information 701 may be changed, deleted, or added to while broadcast programs are being transmitted.

The timer 603 measures the current time.

Figure 8:
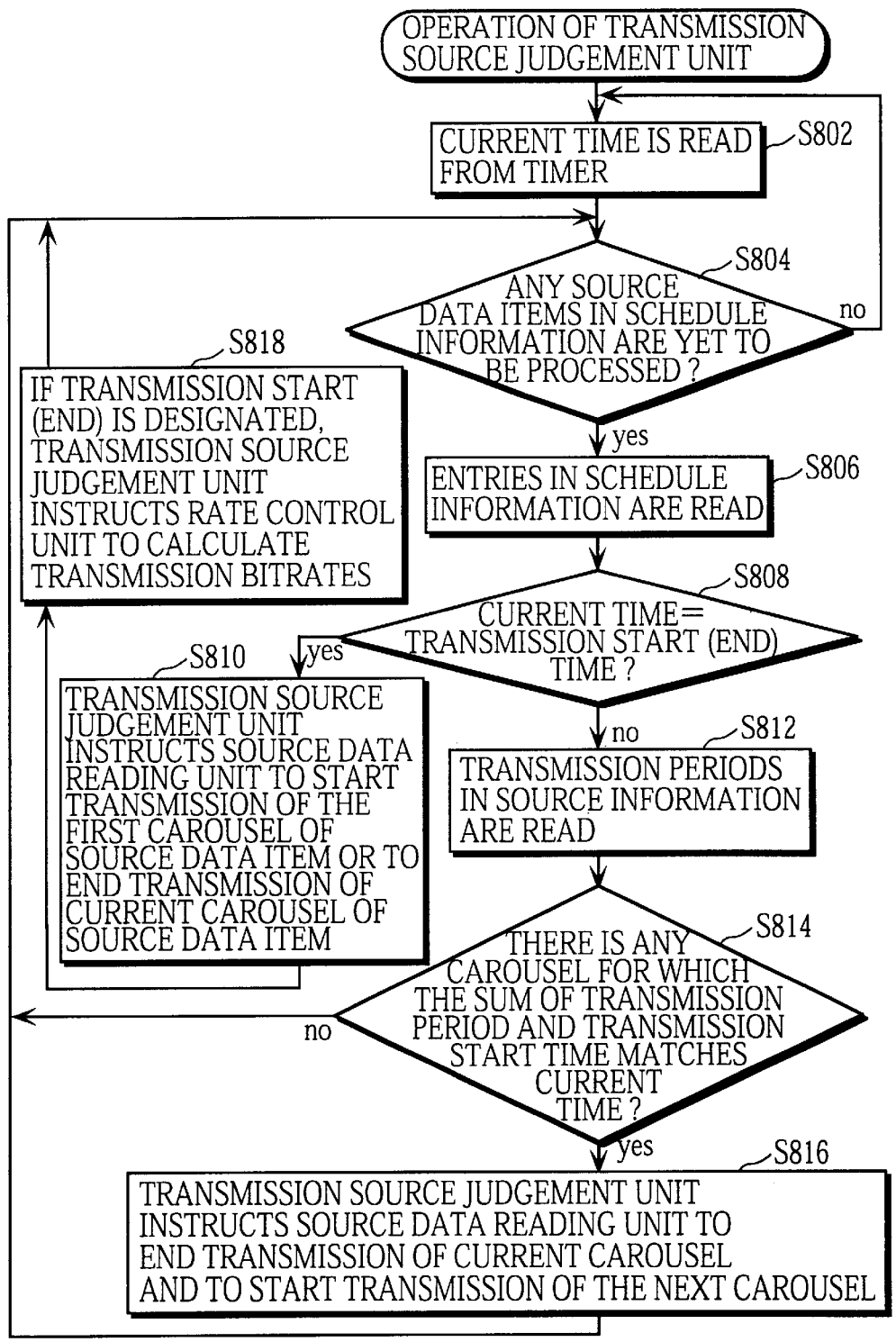
FIG. 8 is a flowchart showing the operation of a transmission source judgement unit of the first embodiment.

The transmission source judgement unit 604 performs the processing in the flowchart shown in FIG. 8. The transmission source judgement unit 604 first reads the current time from the timer 603 (S802) and judges whether any source data items in the schedule information 701 are yet to be processed (S804). If the judgement result is negative, the processing returns to S802. If the judgement result is affirmative, the transmission source judgement unit 604 reads entries in one of the rows of the schedule information 701 related to the unprocessed source data items (S806) and compares the current time with the read transmission start (or end) time (S808). If the current time matches the transmission start time, the transmission source judgement unit 604 then reads the name of the first carousel of the corresponding source data item from the source information 201, informs the source name and carousel name to the source data reading unit 107, instructs the source data reading unit 107 to start the transmission of the first carousel of the source data item (S810), and performs the operation in S818. If the current time matches the read transmission end time, the transmission source judgement unit 604 sends the source name and the name of the current carousel to the source data reading unit 107, instructs the source data reading unit 107 to end the transmission of the current carousel of the source data item (S810), and performs the operation in S818. If the current time neither matches the transmission start time nor the transmission end time, the transmission source judgement unit 604 reads the corresponding transmission periods in the transmission period column 204 in the source information 201 (S812), and judges whether there is any carousel for which the sum of the transmission period and the transmission start time matches the current time (S814). If the judgement result is negative, the processing returns to S804. If the judgement result is affirmative, the transmission source judgement unit 604 informs the source data reading unit 107 of the corresponding source name and carousel name, instructs the source data reading unit 107 to end the transmission of the current carousel and to start the transmission of the next carousel (S816), and returns to the operation in S804.

The following description is based on the assumption that the schedule information 701 is held in the schedule information storage unit 601, the source information 201 is held in the source data storage unit 101, the current time given by the timer 603 is 10:05 Jan. 1, 1999, and the transmission source judgement unit 604 reads entries in the first row of the schedule information 701. In this case, the current time does not match the read transmission start time but matches the sum of the read transmission start time and the transmission period of the carousel 1 of the source A. Therefore, the transmission source judgement unit 604 instructs the source data reading unit 107 to end the transmission of the carousel 1 and to start the transmission of the carousel 2.

After the start or end of the transmission of a source data item is designated, the transmission source judgement unit 604 instructs the rate control unit 110 to calculate transmission bitrates of source data items to be sent and the processing returns to S804. Each transmission bitrate means a portion of the total bitrate assigned to a source data item.

Note that if at least one of source data items that are currently being sent is updated after the transmission bitrate calculation is designated, the transmission source judgement unit 604 instructs the rate control unit 110 to recalculate transmission bitrates of the source data items. By doing so, the change in currently sent source data items made during broadcasting can be properly dealt with by dynamically adjusting the transmission bitrates of the source data items.

The warning unit 106 displays a warning message on a display (not shown in the drawings) or makes a beep tone if the operator inappropriately sets an initial bitrate. By doing so, the warning unit 106 informs the operator that the initial bitrate setting is inappropriate.

FIG. 9 shows a total bitrate table 901 generated by the warning unit 106. The total bitrate table 901 includes a start time column 902, an end time column 903, and a total initial bitrate column 904. Each row of this table 901 shows the sum of the initial bitrates of source data items that are sent between the start time and end time.

Figure 10:
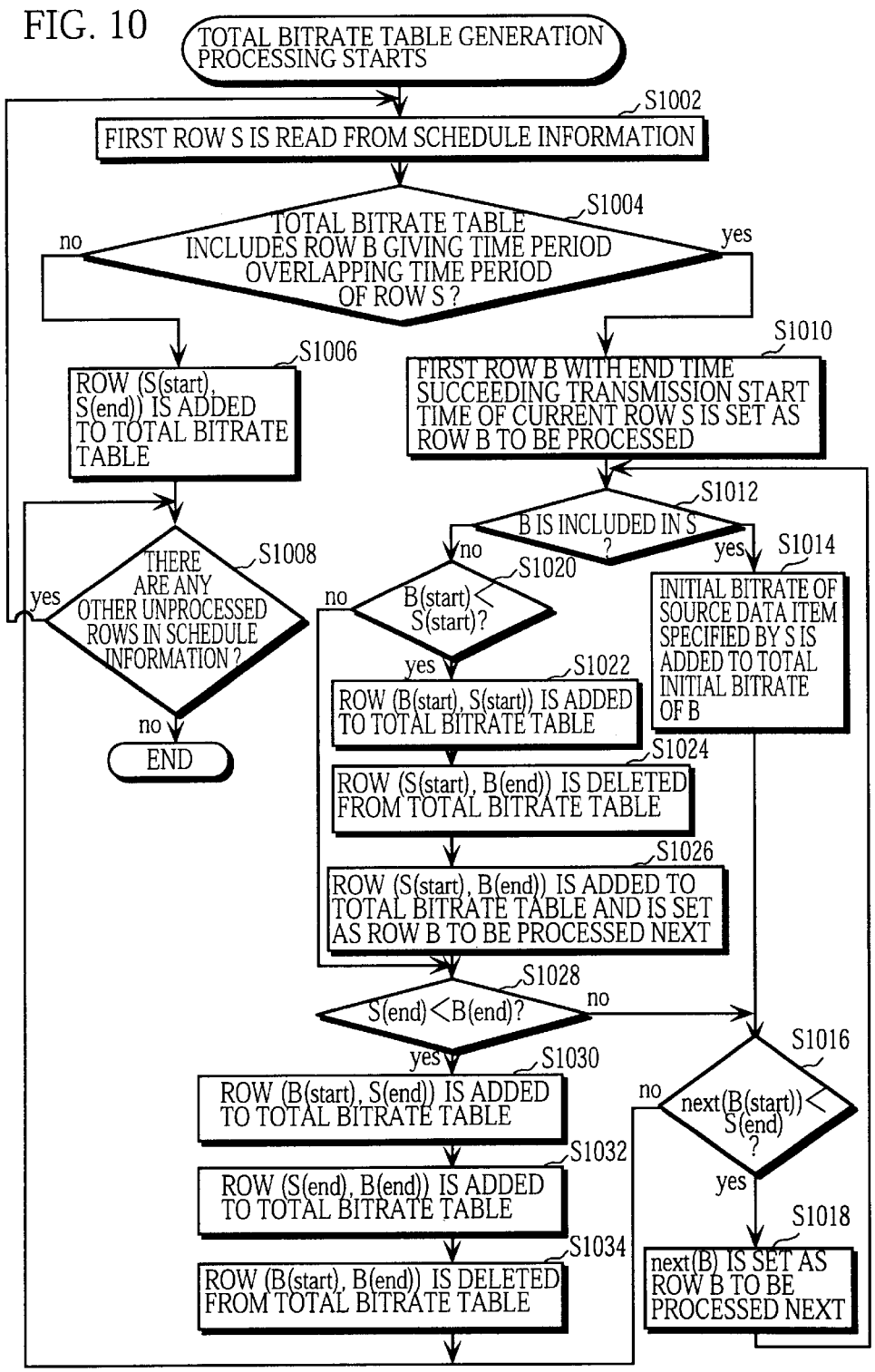
FIG. 10 is a flowchart showing the operation of the warning unit of the first embodiment.

The operation of the warning unit 106 for generating the total bitrate table 901 is described below with reference to the flowchart shown in FIG. 10. It should be noted here that each row of the schedule information 701 is hereinafter referred to as a "row S" and each row of the total bitrate table 901 as a "row B". Also, in FIG. 10, the sign "S(start)" refers to a transmission start time in the schedule information 701, the sign "S(end)" to a transmission end time in the schedule information 701, the sign "B(start)" to a start time in the total bitrate table 901, and the sign "B(end)" to an end time in the total bitrate table 901. The warning unit 106 first reads the first row S from the schedule information 701 held in the schedule information storage unit 601 (S1002) and judges whether the total bitrate table 901 includes a row B giving a time period that overlaps the period between the transmission start time and transmission end time of the row S (S1004). If the judgement result is negative, the warning unit 106 adds a new row to the total bitrate table 901 by setting the start time as the transmission start time in the row S, the end time as the transmission end time in the row S, and the total initial bitrate as the initial bitrate corresponding to the source name in the row S (a value held in the bitrate storage unit 103 (see FIG. 5)) (S1006).

After a new row is added to the total bitrate table 901, the warning unit 106 judges whether there are any other unprocessed rows in the schedule information (S1008). If the judgement result is affirmative, the processing returns to S1002; if the judgement result is negative, the processing ends.

If the total bitrate table 901 includes at least one row B that gives a time period overlapping the period between the transmission start time and transmission end time of the row S (S1004), the warning unit 106 sequentially examines each of such rows B. Rows of the total bitrate table 901 are arranged according to the start times. The sign "next( )" in FIG. 10 refers to the row B giving the earliest start time except for the currently processed row B and is used to search for a row B to be processed next, that is, the first row B with an end time that succeeds the transmission start time of the current row S of the schedule information (S1010).

The warning unit 106 then checks whether B is included in S (S1012). Here, in this specification, it can be said that B is included in S if a condition "S(start)≦B(end)≦S(end)" is satisfied. If B is included in S, the warning unit 106 adds the initial bitrate of the source data item specified by S to the total initial bitrate of B (S1014). The warning unit 106 then judges whether a condition "next(B(start)<S(end)" is satisfied (S1016). If this condition is satisfied, the warning unit 106 sets the next (B) as a new B (S1018). Then the processing returns to S1012 and the stated processing is performed for the new B.

If the condition "next(B(start)<S(end)" is not satisfied (S1016), the total bitrate table 901 includes no row whose time period overlaps that of the currently processed row of the schedule information. Therefore, the processing returns to S1002 and another row S of the schedule information is processed.

If the judgement result in S1012 is that B is not included in S, the warning unit 106 judges whether a condition "B(start)<S(start)" is satisfied (S1020). If the judgement result is affirmative, the warning unit 106 adds a new row B to the total bitrate table 901 by setting the start time as B(start), the end time as S(start), and the total initial bitrate as B(the sum of initial bitrates) (S1022). The warning unit 106 then deletes the corresponding original row B (S1024), generates another new row by setting the start time as S(start), the end time as B(end), and the total initial bitrate as B(the sum of initial bitrates)+initial bitrate of S(source data item)), and sets this row B as a new row B to be processed (S1026). Then the processing proceeds to S1028.

If the condition "B(start)<S(start)" is not satisfied (S1020), the warning unit 106 judges whether a condition "S(end)<B(end)" is satisfied (S1028). If the judgement result is negative, the processing proceeds to S1016 and the next row of the total bitrate table 901 is processed. If the condition "S(end)<B(end)" is satisfied, the warning unit 106 generates a new row in the total bitrate table 901 by setting the start time as B(start), the end time as S(end), and the total initial bitrate as B(the sum of initial bitrates)+the initial bitrate of S(source data item)) (S1030). The warning unit 106 then generates another new row in the total bitrate table 901 by setting the start time as S(end), the end time as B(end), and the total initial bitrate as B(the sum of initial bitrates)) (S1032) and deletes the corresponding original B row (S1034). The operation of the warning unit 106 then returns to S1008 and another row of the schedule information is processed.

By referring to the total bitrate table 901 generated in the manner described above, the sum of initial bitrates in each time period can be obtained. When the total initial bitrate in a row of the total bitrate table 901 exceeds the total bitrate shown in FIG. 5, the warning unit 106 informs the operator of the corresponding time period. Note that the warning unit 106 may issue a warning when any other condition is satisfied, such as when the ratio of the sum of initial bitrates to the total bitrate becomes N % or more. This operation for generating a total bitrate table may be performed when the bitrate setting unit 104 newly assigns an initial bitrate to a source data item or when the transmission schedule management unit 105 generates or changes a transmission schedule.

The source data reading unit 107 includes an area for storing transmission source information and generates the transmission source information from source names, carousel names, and transmission start/end designations sent from the transmission source judgement unit 604 of the transmission schedule management unit 105. The source data reading unit 107 reads each source data item from the source data storage unit 101 according to the transmission source information and supplies the read source data item to the source data multiplexing unit 109.

FIG. 11 shows an example of the transmission source information stored in the area of the source data reading unit 107 (transmission source information 1101). The transmission source information 1101 includes a source name column 1102, a carousel name column 1103, a transmission stream information column 1104, a transmission bitrate column 1105, and a transmission counter column 1106.

The source data reading unit 107 updates the transmission source information 1101, whenever it receives a transmission start/end designation from the transmission source judgement unit 604. Note that source names in the source name column 1102, carousel names in the carousel name column 1103, and transmission stream information in the transmission stream information column 1104 are indicated by the transmission source judgement unit 604.

The transmission stream information column 1104 gives information concerning streams of carousels in the transmission source information 1101. This example is based on the assumption that data is sent using a DSM-CC transmission method of MPEG2-TS and the transmission stream information includes PIDs of ESs (Elementary Streams).

The transmission bitrate column 1105 gives transmission bitrates indicated by the rate control unit 110. The data multiplexing unit 111 multiplexes each source data item into the transport stream of a broadcast program according to the corresponding transmission bitrate in the transmission bitrate column 1105.

The transmission counter column 1106 gives transmission counter values. Each time the data multiplexing unit 111 multiplexes a carousel into the transport stream, a value obtained from the transmission bitrate of the multiplexed carousel is added to the corresponding transmission counter value.

Figure 12:
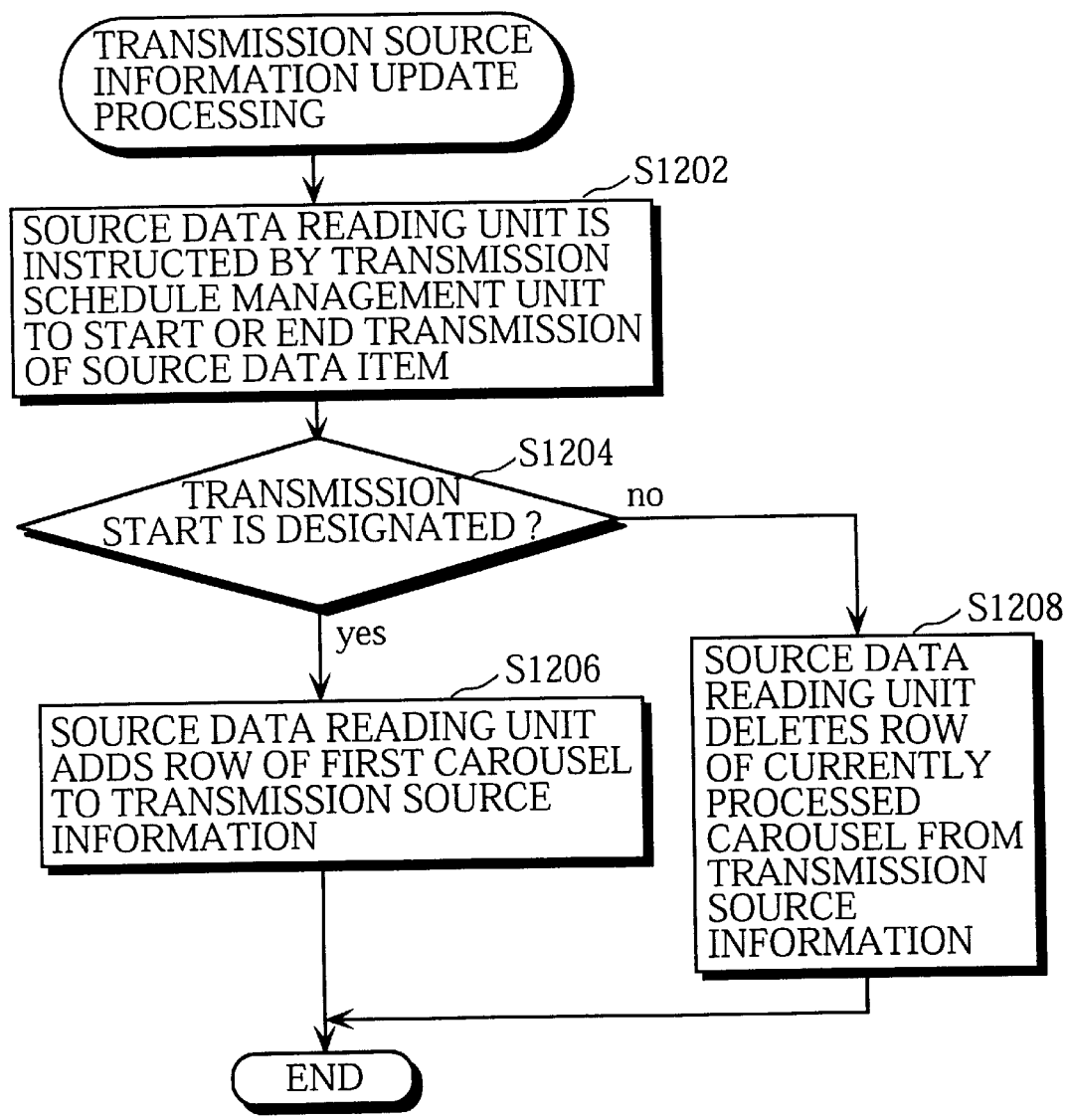
FIG. 12 is a flowchart showing the operation of a source data reading unit of the first embodiment for updating the transmission source information.

The following is a description of the operation of the source data reading unit 107 for updating the transmission source information, with reference to the flowchart shown in FIG. 12.

After being instructed by the transmission schedule management unit 105 to start or end the transmission of a source data item (S1202), the source data reading unit 107 judges whether a transmission start is designated (S1204). If the judgement result is affirmative, the source data reading unit 107 adds a row of the first carousel of the source data item to the transmission source information (S1206) by writing the corresponding source name into the source name column, the corresponding carousel name into the carousel name column, the corresponding PID into the transmission stream information column, a value indicated by the rate control unit 110 into the transmission bitrate column, and "0" into the transmission counter column.

If the judgement result in S1204 is negative, the source data reading unit 107 deletes the row corresponding to the currently processed carousel of the source data item from the transmission source information (S1208).

On being informed of a module name by the intra-source rate control unit 108, the source data reading unit 107 reads the corresponding module data in predetermined units from the source data storage unit 101 and sends the read module data to the source data multiplexing unit 109.

After the source data reading unit 107 updates the transmission source information, the intra-source rate control unit 108 obtains module names and module priorities corresponding to the carousel to be sent from the source information in the source data storage unit 101, and generates a module step table giving the obtained module names.

FIG. 13A shows the initial state of a module step table 1301 generated for the carousel 1 of the source A. The module step table 1301 includes a plurality of rows which each correspond to one module of the carousel 1. In the module step table 1301, each entry in the module name column 1302 gives the name of a module of the carousel 1, and each entry in the transmission step number column 1303 is "0".

The module step table 1301 is used to divide the data of each module composing the carousel 1 into data pieces in predetermined units (size) and to determine the assembling order of data streams of the carousel 1.

On being informed by the source data multiplexing unit 109 that data of the module identified by a module name in the module name column 1302 has been combined with a data stream, the intra-source rate control unit 109 multiplies the module priority of the identified module by the size of the combined (multiplexed) data and adds the multiplication result to the corresponding transmission step number.

The intra-source rate control unit 108 selects a module, out of the modules in the module step table 1301, that has the smallest transmission step number. In the initial state shown in FIG. 13A, every transmission step number is set as "0", so that the intra-source rate control unit 108 selects the module 1*a* at the top of the module name column. Assuming that the size of the module 1*a* is "1", the intra-source rate control unit 108 multiplies the module priority "5" by the size "1" and adds the multiplication result "5" to the corresponding transmission step number. As a result, the module step table 1301 is updated as shown in FIG. 13B. After modules in this table are sequentially selected and data streams of the modules are combined with each other, the module step table 1301 is updated as shown in FIG. 13C. In this state, because the module 1*d* has the smallest transmission step number, the intra-source rate control unit 108 selects data of the module 1*d*. As a result, the module step table 1301 is updated as shown in FIG. 13D. Modules are usually multiplexed using "sections" that are the minimum unit of MPEG2. Although there are cases where section sizes differ from each other, it is assumed that the size of every section is "1" for ease of the explanation in this example.

Note that the intra-source rate control unit 108 generates as many module step tables as there are sources (carousels).

The intra-source rate control unit 108 informs the source data reading unit 107 of the selected module.

The source data multiplexing unit 109 sequentially combines module data read by the source data reading unit 107 to generate a data stream of the source (carousel). After completing the combination of module data, the source data multiplexing unit 109 informs the intra-source rate control unit 108 of the completion.

It should be noted here that the source data multiplexing unit 109 generates as many data streams as there are source names in the transmission source information 1101 in the source data reading unit 107.

Figure 14:
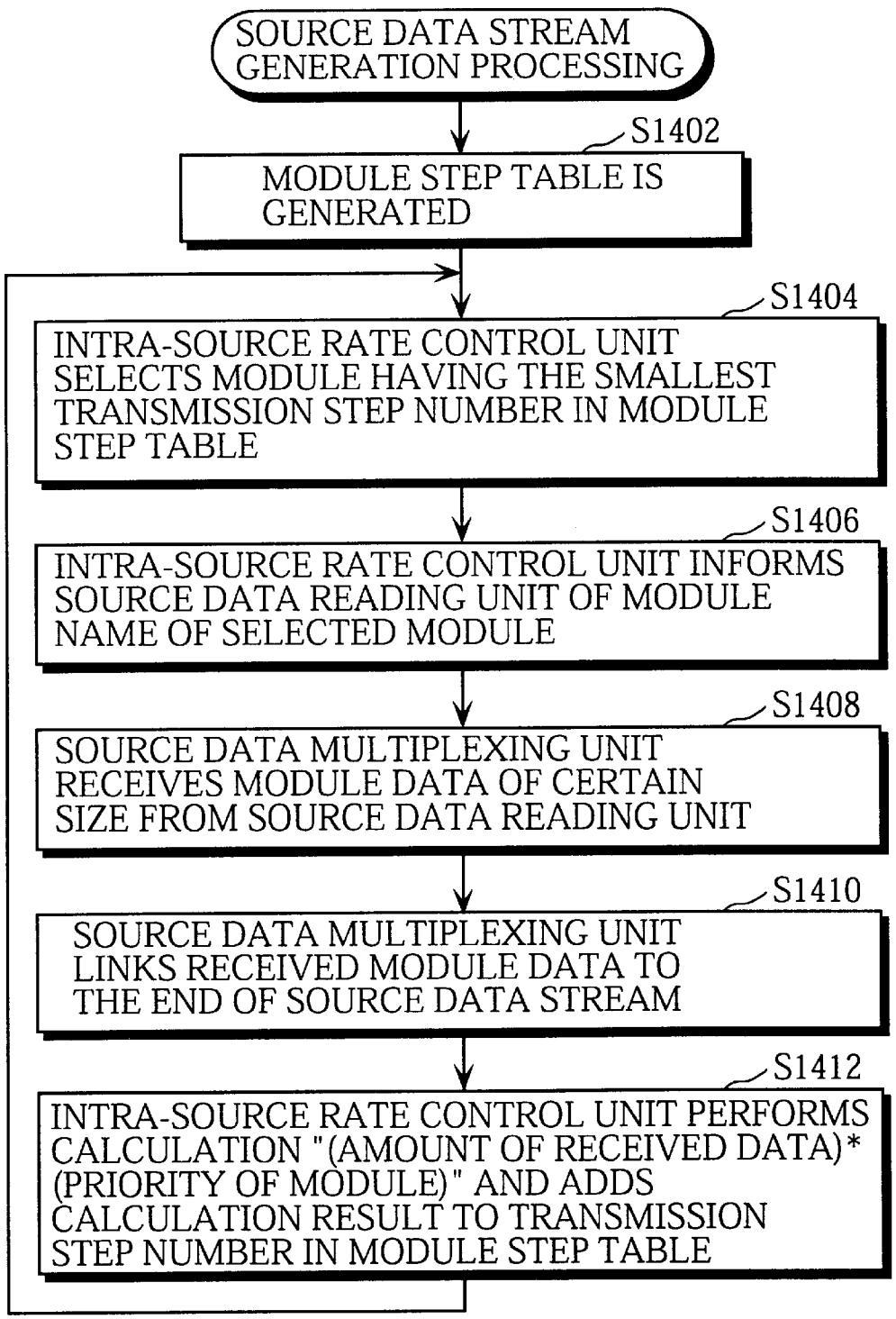
FIG. 14 is a flowchart showing the operation of a source data multiplexing unit of the first embodiment for generating data streams of source data.

The operation for generating data streams is described below with reference to the flowchart shown in FIG. 14.

After the source data reading unit 107 generates or updates the transmission source information 1101, the intra-source rate control unit 108 generates the module step table 1301 (S1402).

The intra-source rate control unit 108 selects a module having the smallest transmission step number in the module step table 1301 (S1404) and informs the source data reading unit 107 of the module name of the selected module (S1406).

The source data reading unit 107 reads a portion of the corresponding module data of the certain size that succeeds the portion of the module data which was read immediately before the current portion, and sends the read portion to the source data multiplexing unit 109. If the module name is indicated for the first time or the module data has been read to the end, the source data reading unit 107 reads the first portion of the module data of the certain size.

The source data multiplexing unit 109 receives the module data of the certain size from the source data reading unit 107 (S1408) and links the received module data to the end of the data stream of the source (carousel) data (S1410). The intra-source rate control unit 108 performs the calculation "(the amount of the received data)*(the priority of the module)" and adds the calculation result to the corresponding transmission step number in the module step table (S1412). Then the processing returns to S1404.

The data stream of source data generated in this manner is stored in the memory of the data multiplexing unit 111 in a queue.

In this embodiment, the intra-source rate control unit 108 performs the calculation "(the amount of the received data) *(the priority of the module)" and adds the calculation result to the corresponding transmission step number in S1412. However, the intra-source rate control unit 108 may perform the calculation "(the amount of the received data)×(the priority of the module)/(the size of the module)" and adds the calculation result to the corresponding transmission step number. In this case, module data is sent in accordance with how many times each module has been sent, instead of the bitrate (transmission speed) of each module.

After being instructed to calculate a transmission bitrate of each source by the transmission source judgement unit 604 of the transmission schedule management unit 105, the rate control unit 110 calculates the transmission bitrate according to an equation that uses the corresponding initial bitrate as a parameter and informs the source data reading unit 107 of the transmission bitrate.

Figure 15:
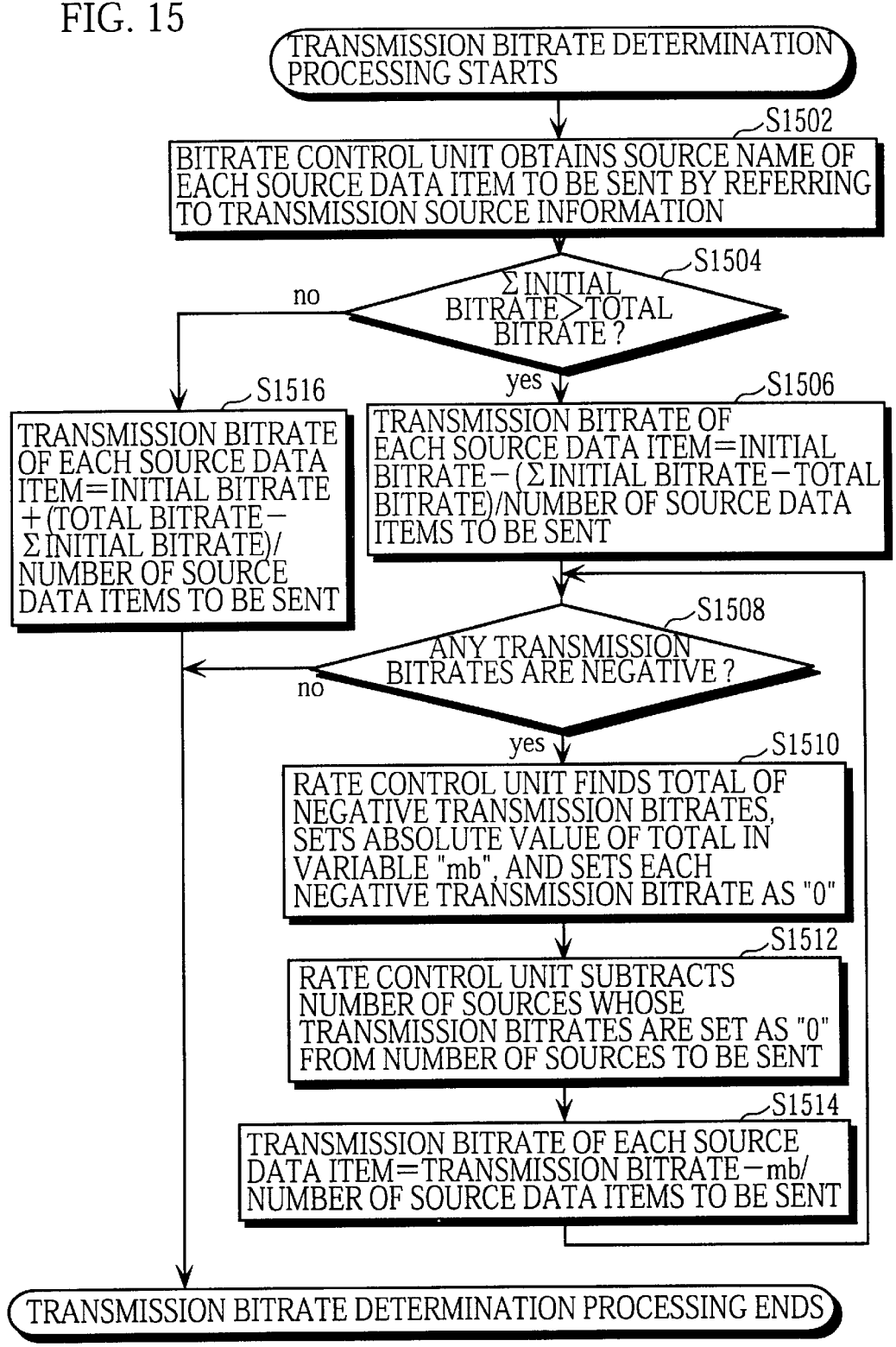
FIG. 15 is a flowchart showing the operation of a rate control unit of the first embodiment for determining the transmission bitrate of each source data item.

The following is a description of the processing for determining the transmission bitrate of each source data item to be sent, with reference to the flowchart shown in FIG. 15.

The bitrate control unit 110 first obtains the source name of each source data item to be sent by referring to the transmission source information 1101 stored in the area of the source data reading unit 107 (S1502). In the case of the transmission source information 1101 shown in FIG. 11, the sources A and B are to be sent. However, because the transmission bitrate has not been calculated as of this point in time, no data is written into the transmission bitrate column 1105. In this example, it is assumed that the transmission source information 1101 only includes information concerning the sources A and B.

The rate control unit 110 then reads the initial bitrates corresponding to the source names in the transmission source information 1101 from the bitrate storage unit 103 and compares the sum of the read initial bitrates with the total bitrate held in the bitrate storage unit 103 (S1504). If the sum of the initial bitrates does not exceed the total bitrate, the rate control unit 110 obtains the transmission bitrate of each source by performing the calculation "the initial bitrate+(the total bitrate−the sum of the initial bitrates of the sources to be sent)/the number of the sources to be sent". In the case of the transmission source information 1101 shown in FIG. 11, the initial bitrate of the source A is 125 kbit/sec and the initial bitrate of the source B is 100 kbit/sec. Therefore, the transmission bitrate of the source A is set as "125+(2000−(125+100))/2=1012.5 kbit/sec" and the transmission bitrate of the source B is set as "100+ (2000−(125+100))/2=987.5 bit/sec".

If the sum of the initial bitrates exceeds the total bitrate in S1504, the rate control unit 110 calculates the transmission bitrate of each source by performing the calculation "the initial bitrate value−(the sum of the initial bitrates of the sources to be sent−the total bitrate)/the number of the sources to be sent" (S1506). Then the rate control unit 110 judges whether any transmission bitrates calculated in S1506 are negative (S1508). If the judgement result is affirmative, the rate control unit 110 finds a total of the negative transmission bitrates, sets the absolute value of the total in a variable "mb", and sets each of the negative transmission bitrates as "0" (S1510).

The rate control unit 110 then subtracts the number of sources whose transmission bitrates are set as "0" from the number of sources to be sent and sets the subtraction result as a new number of sources to be sent (S1512). The rate control unit 110 then calculates the transmission bitrate of each source to be sent by performing the calculation "the transmission bitrate calculated in S1506–(mb/the new number of sources to be sent)" (S1514). Following this, the processing returns to S1508 to check whether any sources are assigned negative transmission bitrates. The operation in S1508–S1514 is repeated until all sources assigned negative transmission bitrates are eliminated. The rate control unit 110 sets the values obtained after the repetition of S1508–1514 as the final transmission bitrates.

It should be noted here that in the above example, if the sum of the initial bitrates is below the total bitrate in S1504, the rate control unit 110 obtains the transmission bitrate of each source by subtracting the sum of the initial bitrates from the total bitrate, dividing the subtraction result by the number of sources, and uniformly adding the division result to the initial bitrate of each source in S1516. However, the first priority "send_priority" may be preset for each source and the rate control unit 110 may assign the remaining bitrate to the sources according to the first priorities.

As the module priorities in the column 207, each first priority "send_priority" is written into the source information 201 so as to be associated with the corresponding source name. The rate control unit 110 receives the first priorities "send_priority" from the source data reading unit 107.

Although being preset and held in the bitrate storage unit 103 in this embodiment, the initial bitrates may be set as the same values as minimum bitrates described below. Each minimum bitrate is the slowest transmission speed that does not cause problems concerning the response time when a receiving apparatus receives a transport stream into which the corresponding source data item has been multiplexed. Therefore, when the initial bitrates are set as the same values as the minimum bitrates, extra bitrate present when the sum of initial bitrates is under the total bitrate available for transmitting source data can be distributed among sources. This reduces the chances that problems may occur during viewing of the sources.

After performing the processing described above, the rate control unit 110 sets the transmission bitrates obtained after the above processing as the final transmission bitrates. The rate control unit 110 then instructs the source data reading unit 107 to write each final transmission bitrate into the corresponding entry in the transmission bitrate column 1105 of the transmission source information 1101.

After the source data multiplexing unit 109 writes data streams of source data into the memory, the data multiplexing unit 111 obtains a data stream of the source data item having the smallest value in the transmission counter column 1106 of the transmission source information 1101 and multiplexes the obtained data stream into a transport stream so as to succeed the data stream of the source data item which was obtained immediately before the current data stream.

After multiplexing the current data stream into the transport stream, the data multiplexing unit 111 instructs the source data reading unit 107 to perform the calculation "the inverse number of the transmission bitrate*the amount of obtained data*1000" and to add the calculation result to the corresponding transmission counter value in the transmission source information 1101.

In this example, it is assumed that the amount of obtained data is equal to the amount of data in one TP (Transport Packet) as stipulated by MPEG2. Although each transmission counter value is multiplied by the value "1000" during the updating of the transmission counter value in this embodiment, this operation does not necessarily need to be performed since it is only performed to prevent the transmission counter value from becoming too small.

The transport stream into which data streams of source data have been multiplexed is outputted to the data transmission unit 112.

Note that, aside from the data streams of source data, the data multiplexing unit 111 obtains video and audio streams of broadcast programs and multiplexes these streams into the transport stream. However, this is not the subject of the present invention and so is not described here.

Figure 16:
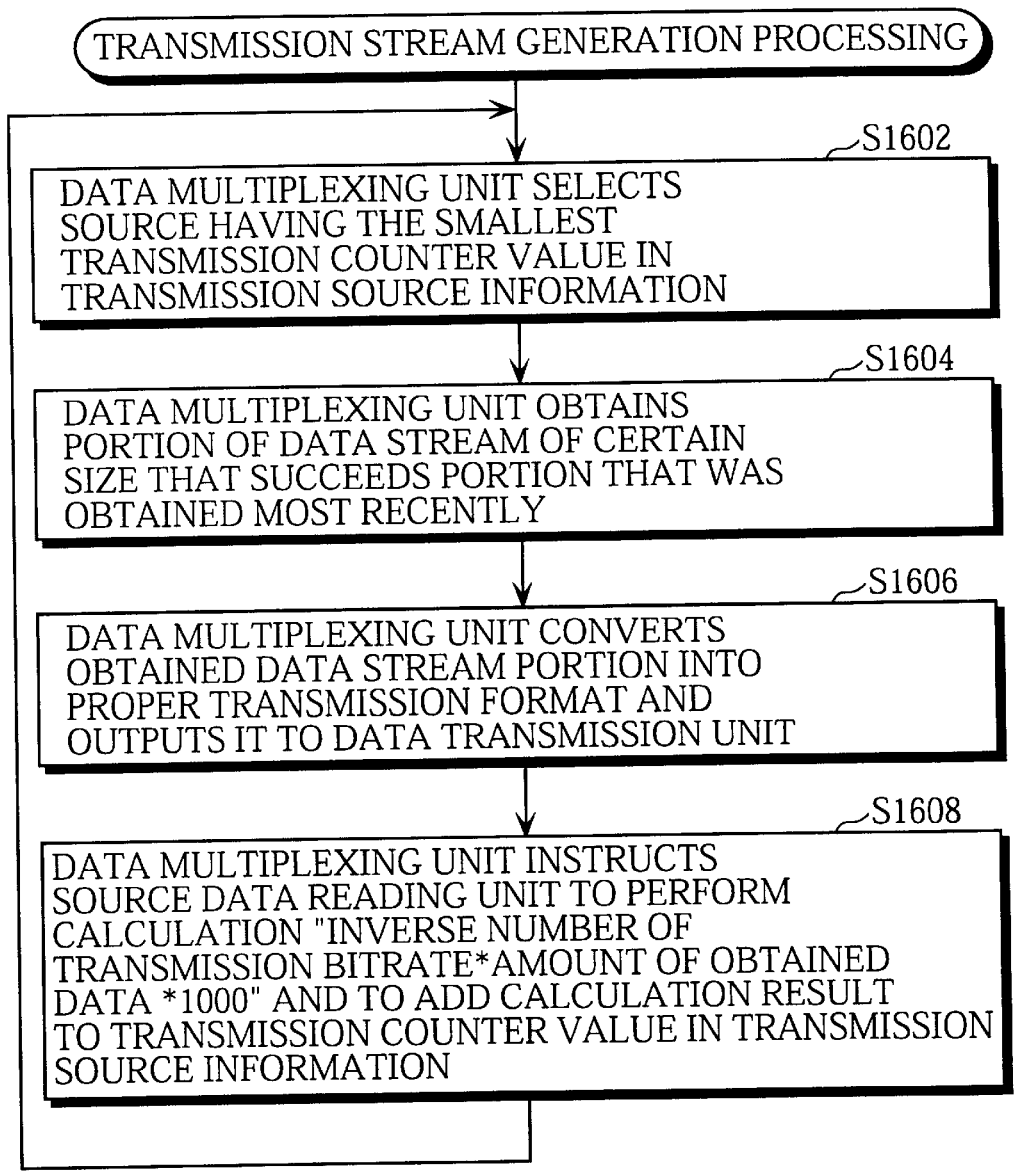
FIG. 16 is a flowchart showing the operation of a data multiplexing unit of the first embodiment.

The processing performed by the data multiplexing unit 111 is described below with reference to the flowchart shown in FIG. 16.

The data multiplexing unit 111 first selects a source having the smallest transmission counter value in the transmission source information 1101 (S1602). After selecting a source to be sent, the data multiplexing unit 111 obtains a portion of the corresponding data stream of the certain size that succeeds the portion of the data stream which was obtained immediately before the current portion. If no portion of the data stream has previously been obtained, the data multiplexing unit 111 obtains the first portion of the data stream of the certain size (S1604).

When necessary, the data multiplexing unit 111 converts the obtained data stream portion into the proper transmission format and outputs the data stream portion to the data transmission unit 112 (S1606). The data multiplexing unit 111 then instructs the source data reading unit 107 to perform the calculation "the inverse number of the transmission bitrate*the amount of obtained data*1000" and to add the calculation result to the corresponding transmission counter value in the transmission source information 1101 (S1608). Then the operation returns to S1802.

The data transmission unit 112 receives the transport stream into which data stream of source data has been multiplexed from the data multiplexing unit 111 and continuously sends the transport stream at the total bitrate in the bitrate storage unit 103.

In FIG. 11, the transmission counter column 1106 gives values obtained after 15 units of the source A and 14 units of the source B have been sent. The data multiplexing unit 111 then compares the transmission counter values of the sources A and B and selects the source B as the source to be sent. After sending the stream of the source B to the data transmission unit 112, the data multiplexing unit 111 selects the source A as the source to be sent next because the transmission counter value of the source B becomes "15.19". The data multiplexing unit 111 continues this operation until the transmission source information 1101 is changed according to the schedule information 701.

The digital broadcasting apparatus of this embodiment may be achieved without the warning unit 106, the bitrate setting unit 104, the source data input unit 102, the intra-source rate control unit 108, and the source data multiplexing unit 109. In this case, source data is prestored in the source data storage unit 101 and the bitrate of each source data item and the total bitrate are prestored in the bitrate storage unit 103. When the current time reaches a transmission period of a source that is set in the transmission schedule management unit 105, the data multiplexing unit 111 directly obtains data of the source selected in S1602 and generates a transport stream into which the obtained data is multiplexed. During this operation, source data items are obtained from the source data reading unit 107 without reference to various information concerning modules, such as priorities of the modules. That is, modules are sequentially obtained one section at a time.

<Second Embodiment>

A digital broadcasting apparatus of the second embodiment has almost the same construction as the digital broadcasting apparatus of the first embodiment shown in FIG. 1. The difference is that the bitrate storage unit 103 of this embodiment holds the initial transmission cycle, instead of the initial bitrate, for each source data item. Accordingly, some units of the digital broadcasting apparatus of this embodiment function in different ways to those of the digital broadcasting apparatus of the first embodiment. The following description concerns the aspects unique to the second embodiment.

FIG. 17 corresponds to FIG. 5 of the first embodiment and shows an example content of the bitrate storage unit 103 of this embodiment.

The total bitrate is the same as in the first embodiment. An initial transmission cycle, instead of an initial bitrate, is written so as to be associated with the corresponding source name. The initial transmission cycle is an initial value (set value) showing the time necessary to send the corresponding source data item once. In this example, one second is taken to send the source A once, two seconds are taken to send the source B once, and 1.5 seconds are taken to send the source C once.

Here, sending a source data item once means that a current carousel of the source data item is sent once and sending a carousel once means that every module composing the carousel is sent at least once.

In the first embodiment, an initial bitrate is written for each source data item and every carousel of the source data item is sent at the transmission bitrate obtained from the initial bitrate. However, in the present embodiment, an initial transmission cycle is written for each source data item and the transmission bitrate obtained from the initial transmission cycle is adjusted according to which carousel of the source data item is to be sent. This is because carousels composing each source data item have different sizes and the transmission bitrate of the source data item needs to be adjusted according to the size of the current carousel to keep the initial transmission cycle constant.

In this embodiment, therefore, the schedule information in the schedule information storage unit 601 of the transmission schedule management unit 105 gives information for each carousel, instead of for each source.

FIG. 18 shows the schedule information in the schedule information storage unit 601. The schedule information 1801 includes a carousel name column 1802 in addition to the columns 702–705 of the schedule information 701 shown in FIG. 7.

Figure 19:
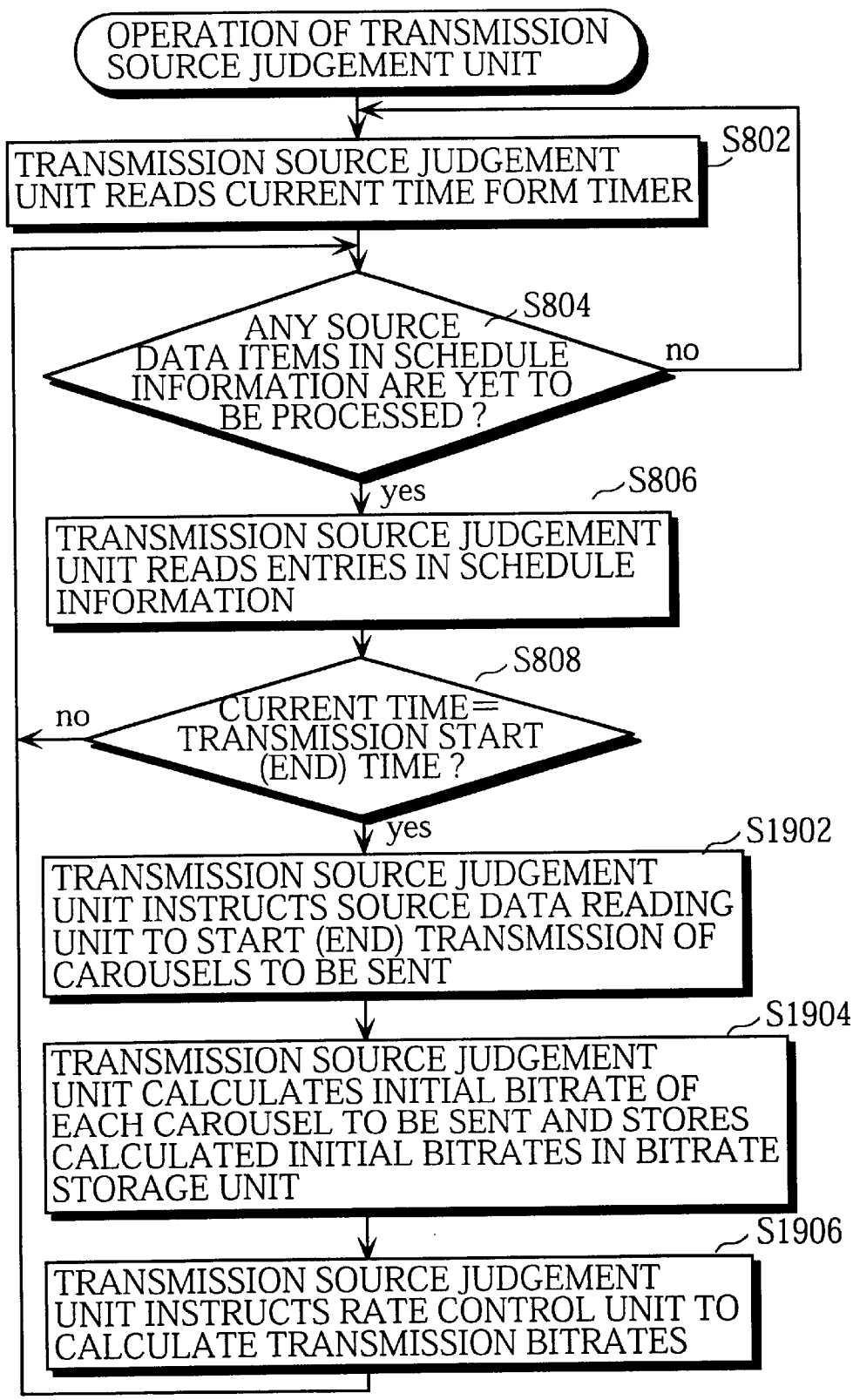
FIG. 19 is a flowchart showing the operation of a transmission source judgement unit of a source data storage unit of the second embodiment.

The transmission source judgement unit 604 performs the processing in the flowchart shown in FIG. 19. Note that steps S802–S808 are the same as in the first embodiment and so are not described here.

If it is judged that the current time matches any transmission start (end) times in S808, the transmission source judgement unit 604 instructs the source data reading unit 107 to start (or end) the transmission of the corresponding carousels (S1902).

The transmission source judgement unit 604 then calculates the initial bitrate of each carousel to be sent and stores the calculated initial bitrates in the bitrate storage unit 103 (S1904).

More specifically, in S1904, the initial bitrate of each carousel is calculated from the corresponding module sizes and module priorities in the source information 201 and the corresponding initial transmission cycle in the bitrate storage unit 103.

The initial bitrate of each module composing the carousel C to be sent is calculated from Equation 1 given below.

$$\text{bitrate} = \frac{\text{module\_size} \times P \times \text{priority}}{\text{recommended\_term}} \qquad \text{(Equation 1)}$$

In this equation, "bitrate" is the initial bitrate of a module, "recommended_term" is the corresponding initial transmission cycle, "priority" is the corresponding module priority, and "P" is a value obtained from Equation 2 given below.

$$P = \sum_{MODULE \ OF \ C} \frac{1}{\text{priority}} \qquad \text{(Equation 2)}$$

The initial bitrate of the carousel C is set as the highest among the initial bitrates of modules composing the carousel C that are calculated according to Equation 1.

In the case of the carousel 1, "0.39" will be obtained from Equation 2 (P=1/5+1/10+1/20+1/25).

By substituting "0.39" into Equation 1, the initial bitrate of each module of the carousel 1 will be as follows.

\*Module 1a: (30000×0.39×5)/1=58500 bps
\*Module 1b: (20000×0.39×10)/1=78000 bps
\*Module 1c: (40000×0.39×20)/1=312000 bps
\*Module 1d: (10000×0.39×25)/1=97500 bps Because the initial bitrate of the module 1c is the highest among the obtained bitrates, the bitrate storage unit 103 holds "312 kbit/sec" as the initial bitrate of the carousel 1, as shown in FIG. 20.

The transmission source judgement unit 604 then instructs the rate control unit 110 to calculate the transmission bitrate of the carousel 1 (S1906) and the processing returns to S804.

As described above, the present embodiment differs from the first embodiment in that, within a source data item, the transmission bitrate of each carousel is set independently of transmission bitrates of other carousels.

<Third Embodiment>

A digital broadcasting apparatus of the third embodiment has almost the same construction as that of the first embodiment. The difference is that the schedule information in the schedule information storage unit 601 differs from that of the first embodiment. Therefore, some units of the digital broadcasting apparatus of this embodiment function in different ways to those of the digital broadcasting apparatus of the first embodiment. The following description concerns the aspects unique to the third embodiment. Note that the block diagram of this embodiment is the same as in FIG. 1.

FIG. 21 shows an example of schedule information 2101 stored in the schedule information storage unit 601 of this embodiment. As shown in this drawing, the schedule information 2101 includes an initial bitrate column 2102 in addition to the columns 702–705 of the schedule information 701 of the first embodiment. For instance, the first row of the schedule information 2101 shows that the source A has the transmission start time "Jan. 1, 1999, 10:00:00", the transmission end time "Jan. 1, 1999, 10:20:00", the initial bitrate "125 kbit/sec", and the PID "0x100".

In this embodiment, while the bitrate storage unit 103 holds an initial bitrate for each source, various initial bitrates are set for each source data item with respect to transmission times. The various initial bitrates are inputted by the operator via the schedule information input unit 602.

Because the schedule information 2101 in the schedule information storage unit 601 includes the initial bitrate column 2102, the rate control unit 110 calculates transmission bitrates from the initial bitrates written in the initial bitrate column 2102, instead of from the initial bitrates in the bitrate storage unit 103.

In this manner, a plurality of initial bitrates can be specified for each source data item with respect to transmission times.

<Fourth Embodiment>

The construction of a digital broadcasting apparatus of the fourth embodiment is almost the same as that of the digital broadcasting apparatus of the first embodiment. The difference is that each initial bitrate in the bitrate storage unit 103 of this embodiment is set for a carousel, instead of for a source data item.

FIG. 22 shows an example content of the bitrate storage unit 103. The total bitrate is the same as in the first embodiment. An initial bitrate is written for each carousel. The schedule information in the schedule information storage unit 601 is the same as the schedule information 1801 of the second embodiment.

While the rate control unit of the first embodiment calculates a transmission bitrate of each source data item from the initial bitrate of the source data item, the rate control unit of this embodiment calculates a transmission bitrate of each carousel from the initial bitrate of the carousel.

<Fifth Embodiment>

A digital broadcasting apparatus of the fifth embodiment has almost the same construction as that of the first embodiment. The difference is that the content of the bitrate storage unit 103 differs from that in the first embodiment.

FIG. 23 shows an example content of the bitrate storage unit 103. The total bitrate is the same as in the first embodiment. As shown in this drawing, the bitrate storage unit 103 of this embodiment holds minimum bitrates 2302, maximum bitrates 2303, and transmission priorities 2304, in addition to initial bitrates 2301.

Each minimum bitrate 2302 means the lowest bitrate that can be set for the corresponding source data item. If a source data item is sent at less than its minimum bitrate, the response time taken by a receiving apparatus that receives the source data item becomes too long and the source data item ceases to function properly. For instance, if a source data item is updated at intervals of 10 seconds and the maximum response time taken by a receiving apparatus exceeds 10 seconds, this source data item becomes meaningless.

Each maximum bitrate 1303 means the highest meaningful bitrate that can be set for the corresponding source data item. Transmitting a source data item at more than its maximum bitrate only causes an insignificant reduction in response time (from 0.2 second to 0.1 second, for instance).

Each transmission priority 2304 means a transmission priority given to the corresponding source data item. More specifically, if the total bitrate exceeds the sum of initial bitrates of source data items to be sent, a source data item given a higher transmission priority is assigned a larger amount of the remaining bandwidth. On the other hand, if the total bitrate falls below the sum of initial bitrates of source data items to be sent, the smaller amount of bandwidth is trimmed from the bandwidth assigned to a source data item given a higher transmission priority.

The operation unique to the rate control unit 110 of the present embodiment is described below with reference to the flowchart shown in FIG. 24.

The operations in S2402 and S2404 are the same as those in S1502 and S1504 in FIG. 15 of the first embodiment. If it is judged that the sum of initial bitrates of source data items is below the total bitrate in S2404, that is, if the entire bitrate is not used even if each source data item to be sent is assigned a transmission bitrate equal to the corresponding initial bitrate, transmission bitrates are recalculated by performing the calculation "the initial bitrate+(the total bitrate−the sum of the initial bitrates)*the transmission priority/the sum of the transmission priorities" (S2406).

It is then judged whether any source data items are assigned transmission bitrates that exceed the corresponding maximum bitrates (S2408). If the judgement result is negative, the processing ends. If the judgement result is affirmative, the difference between the transmission bitrate and the maximum bitrate of each of such source data items is obtained, the differences are summed up, the summing result is set in a variable "ss", and each of such source data items is assigned a transmission bitrate equal to the corresponding maximum bitrate (S2410). The source data items whose transmission bitrates are set as the corresponding maximum bitrates are excluded from a group of source data items whose transmission bitrates are to be recalculated (S2412). The number of source data items whose transmission bitrates are to be recalculated is checked (S2414) and, if the check result is zero, the processing ends. If the check result is one or more, the transmission bitrate of each source data item is calculated by performing the calculation "the transmission bitrate+ss*the transmission priority/the sum of the transmission priorities" (S2416) and the processing returns to S2408. If the transmission bitrate of every source data item is set as the corresponding maximum bitrate and the sum of the transmission bitrates is below the total bitrate after this process, the remaining bitrate is assigned to video and audio data or NULL packets are inserted into the remaining bitrate.

If it is judged that the sum of the initial bitrates assigned to source data items to be sent exceeds the total bitrate in S2404, it is then judged whether the sum of the minimum bitrates of the source data items exceeds the total bitrate (S2418). If the judgement result is negative, the transmission bitrate of each source data item is calculated by performing the calculation "the initial bitrate−(the sum of the initial bitrates−the total bitrate)*(1/the transmission priority)/the sum of(1/the transmission priority) of each source" (S2420). It is then judged whether any source data items are assigned transmission bitrates that are below the corresponding minimum bitrates (S2422) and, if there is no such source data item, the processing ends.

If there are any source data items whose transmission bitrates are below the corresponding minimum bitrates, the difference between the transmission bitrate and the minimum bitrate of each of such source data items is obtained, the differences are summed up, the summing result is set in the variable "ss", and the transmission bitrate of each of such source data items is set as the corresponding minimum bitrate (S2424). Then the source data items whose transmission bitrates are set as the corresponding minimum bitrates are excluded from the group of source data items whose transmission bitrates are to be recalculated (S2426). It is then judged whether there are any source data items whose transmission bitrates are to be recalculated (S2428) and, if there is no such source data item, the processing ends. If the judgement result is affirmative, the transmission bitrate of each source data item is recalculated by performing the calculation "the transmission bitrate−ss*(1/the transmission priority)/the sum of (1/the transmission priority) of each source data item" (S2430) and the processing returns to S2422.

Figure 24:
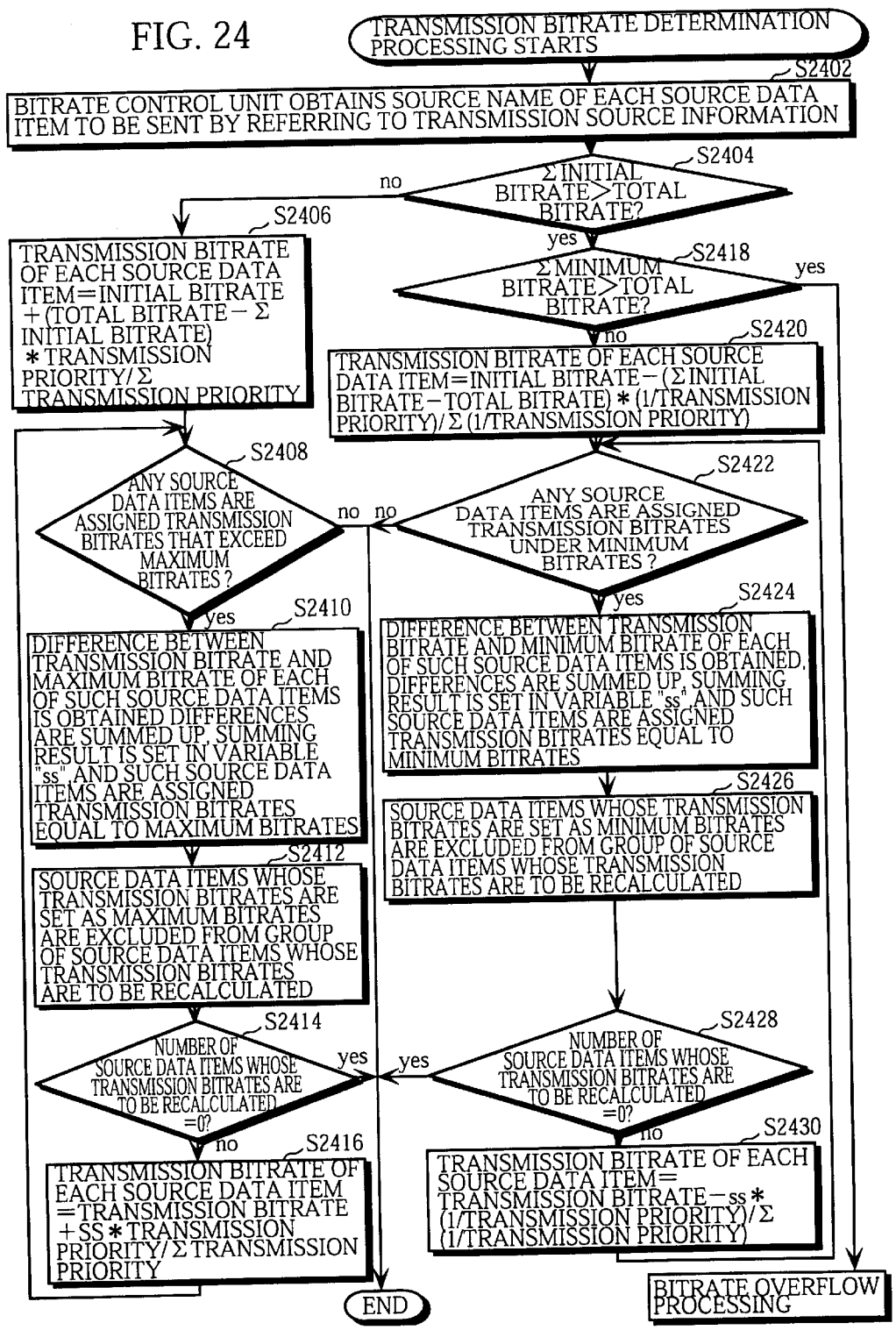
FIG. 24 is a flowchart showing the operation of a rate control unit of the fifth embodiment for determining transmission bitrates.
Figure 25:
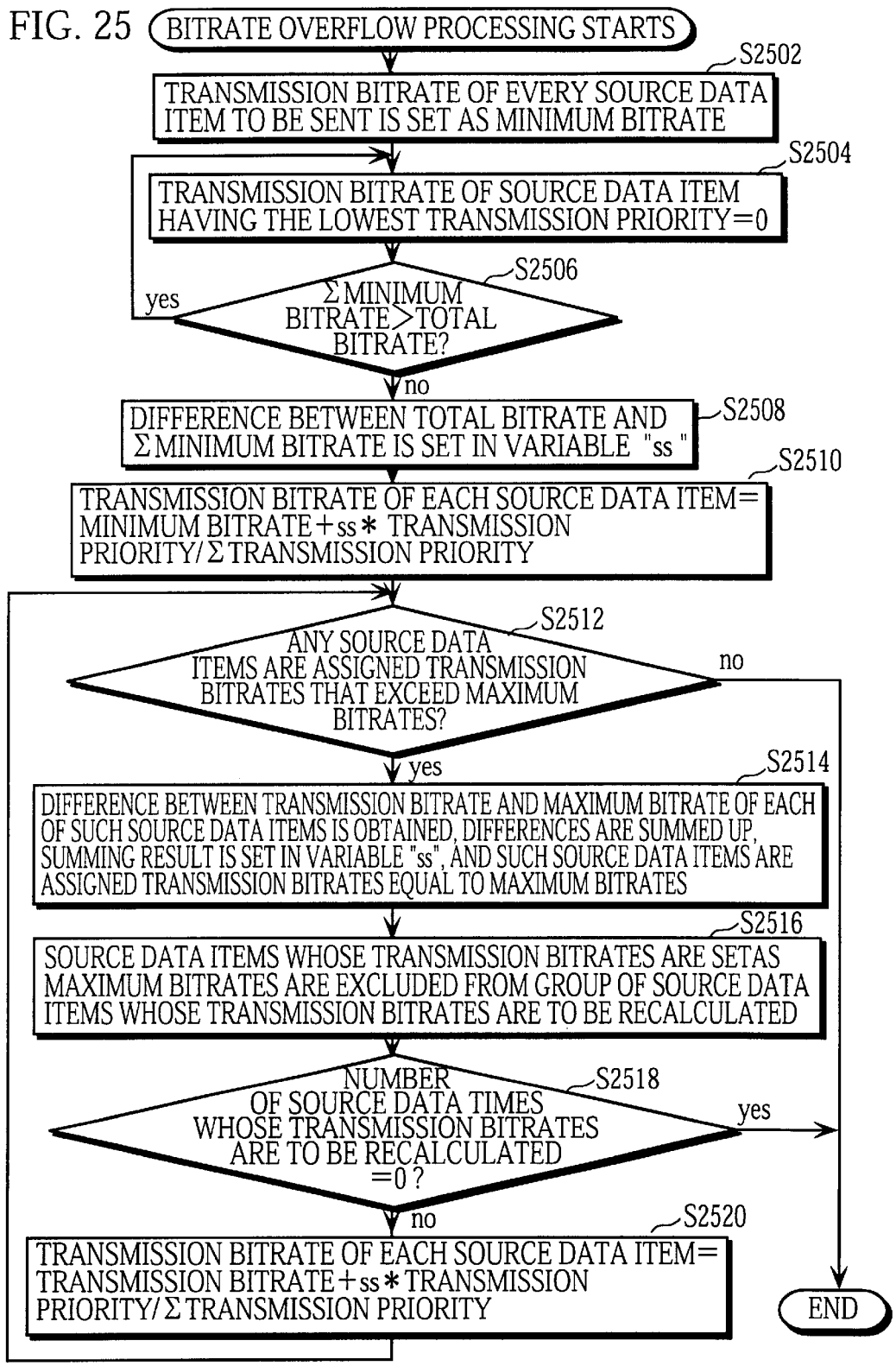
FIG. 25 is a flowchart showing the bitrate overflow operation that is performed by the rate control unit of the fifth embodiment during the calculation of transmission bitrates.

FIG. 25 is a flowchart showing the bitrate overflow processing that is performed if the judgement result in S2418 in FIG. 24 is that the sum of the minimum bitrates exceeds the total bitrate.

First, the transmission bitrate of every source data item to be sent is set as the corresponding minimum bitrate (S2502). Then, the transmission bitrate of a source data item having the lowest transmission priority is set as "0" (S2504) and it is judged whether the sum of minimum bitrates of other source data items exceeds the total bitrate (S2506). If the judgement result is affirmative, the processing returns to S2504. If the judgement result is negative, the sum of minimum bitrates is subtracted from the total bitrate and the subtraction result is set in the variable "ss" (S2508).

The transmission bitrate of each source data item, except for the source data items whose transmission bitrates are set as "0" in S2504, is calculated by performing the calculation "the minimum bitrate+ss*the transmission priority/the sum of transmission priorities" (S2510). The operations in S2512–S2520 are the same as those in S2408–S2416 in FIG. 24. By performing the processing described above, each source data item is assigned a transmission bitrate between the corresponding maximum bitrate and minimum bitrate. If the sum of the transmission bitrates is under the total bitrate even if the transmission bitrate of every source data item is set as the corresponding maximum bitrate, the remaining bitrate is assigned to video and audio data or NULL packets are inserted into the remaining bitrate.

Other aspects are the same as in the first embodiment.

In this embodiment, the transmission bitrate of a source data item having the lowest transmission priority is set as "0" in S2504. However, the second priorities "cut_priority" that are different from the transmission priorities may be included in the source information and the transmission bitrate of a source data item having the highest second priority may be set as "0" as necessary. The second priorities are set and used in a different way to the transmission priorities. That is, a higher second priority "cut_priority" is set for a less important source data item and, if all source data items cannot be fitted into the total bitrate, the source data items having the higher second priorities are dropped first.

<Sixth Embodiment>

A digital broadcasting apparatus of the sixth embodiment has almost the same construction as that of the first embodiment. The difference is that the rate control unit 110 of this embodiment assigns a transmission bitrate to each source data item and adjusts the assigned transmission bitrate according to the size of the current carousel of the source data item.

Figure 26:
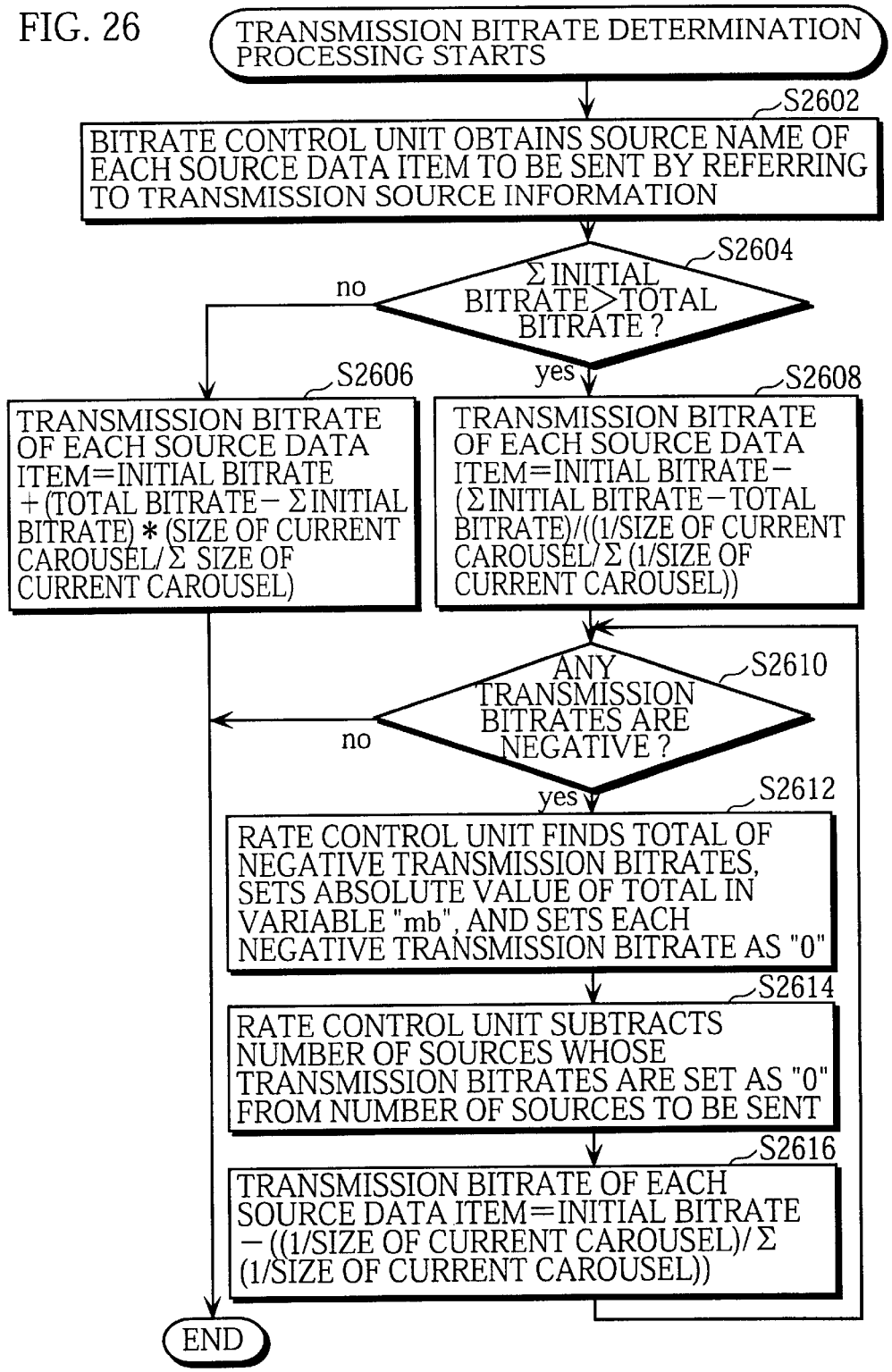
FIG. 26 is a flowchart showing the operation of a rate control unit of the sixth embodiment for determining transmission bitrates.

The operation of the rate control unit 110 for assigning a transmission bitrate to each source data item is described below with reference to the flowchart shown in FIG. 26. It should be noted here that the same operations as in the first embodiment are not described here.

If not all the bandwidth reserved for the transmission of source data is used, the rate control unit 110 assigns the unused bandwidth to each source data item according to the size of the current carousel of the source data item. That is, the rate control unit 110 calculates the transmission bitrate of each source data item by performing the calculation "the initial bitrate+(the total bitrate–the sum of the initial bitrates)*(the size of the current carousel/the sum of sizes of current carousels)". In this manner, the rate control unit 110 assigns a higher bitrate to a source data item whose current carousel has a larger size.

If the bandwidth that is reserved for source data is insufficient to send all source data items, the rate control unit 110 reduces the bitrate assigned to each source data item by an amount that is inversely proportional to the size of the current carousel of the source data item in S2608. That is, the rate control unit 110 calculates a transmission bitrate of each source data item by performing the calculation "the initial bitrate–(the sum of initial bitrates–the total bitrate)/((1/the current carousel size)/the sum of (1/the current carousel size))". In this manner, the rate control unit 110 assigns a higher bitrate to a source data item whose current carousel size is larger or trims a smaller amount of bitrate from the bitrate of the source data item whose current carousel size is larger. In S2616, the same operation as in S2608 is performed.

<Seventh Embodiment>

The digital broadcasting apparatus of the seventh embodiment has almost the same construction as in the first embodiment. The difference is that the intra-source rate control unit 108 of this embodiment differs from that of the first embodiment.

In this embodiment, specific modules of each carousel are definitely sent at predetermined transmission bitrates, while other non-specific modules of the carousel are sent at bitrates calculated from the corresponding priorities.

To do so, the module priority column 207 of the source information 201 held in the source data storage unit 101 gives a predetermined bitrate for each specific module and gives a priority for each non-specific module.

In the first embodiment, the intra-source rate control unit 108 operates independently of the rate control unit 110 and controls, according to the module priorities, the operation of the source data multiplexing unit 109 for generating source data streams from modules in carousels. However, in this embodiment, the intra-source rate control unit 108 sets the carousel bitrate (transmission bitrate) of the carousel including at least one specific module as the transmission bitrate of the source data item including the carousel, obtains a module priority of each specific module from the carousel bitrate and the predetermined transmission bitrate of the specific module, and controls, according to the module priorities, the operation of the source data multiplexing unit 109 for generating source data streams.

When a carousel includes only one specific module, the intra-source rate control unit 108 obtains the module priority "x" of the specific module according to Equation 3 given below.

$$\frac{\frac{1}{x}}{\frac{1}{x} + \sum_n \frac{1}{\text{PRIORITY OF MODULE } n}} \times \text{CAROUSEL BITRATE} = \text{TRANSMISSION BITRATE OF SPECIFIC MODULE}$$ (Equation 3)

In this equation, the transmission bitrate of the specific module is a bitrate value that is predetermined for the specific module, the priority of the module "n" is a module priority that is predetermined for the non-specific module "n", and the carousel bitrate is a transmission bitrate of the corresponding source data item calculated by the rate control unit 110.

The intra-source rate control unit 108 sets "x" found using Equation 3 as the module priority of the specific module and calculates the transmission bitrate of each module from the corresponding priority. In this manner, the intra-source rate control unit 108 sets the transmission bitrate of the specific module as the predetermined bitrate.

This aspect is described below on the assumption that a carousel includes four modules a, b, c, and d, the priorities of the modules b, c, and d are respectively set as "2", "2", and "1", the carousel bitrate is 500 kbps, and the transmission bitrate of the module a is fixed to 100 kbps. These values are substituted into Equation 3 and "x" (the module priority of the module a) is found as "2". Then the intra-source rate control unit 108 calculates the transmission bitrate of each module from the corresponding priority. In this manner, the intra-source rate control unit 108 sets the transmission bitrate of the module a as 100 kbps.

As described above, the priority of each specific module is dynamically set after the rate control unit 110 calculates the total bitrate of the corresponding carousel (the transmission bitrate of the corresponding source data item). Therefore, a transmission bitrate of each specific module is set as the corresponding predetermined bitrate (absolute value) under the total bitrate of the corresponding carousel. That is, the specific module is sent at the transmission bitrate that is equal to the predetermined bitrate.

The above example concerns the case where the transmission bitrate of only one specific module of a carousel is fixed. However, the transmission bitrates of a plurality of specific modules of a carousel can be fixed. To set the transmission bitrates of i specific modules as the corresponding predetermined bitrates, the module priority of each specific module is calculated by solving i simultaneous equations (Equation 4) given below.

$$\left. \begin{array}{l} \dfrac{\dfrac{1}{x_1}}{\dfrac{1}{x_1}+\dfrac{1}{x_2}+\ldots+\dfrac{1}{x_i}+\displaystyle\sum_n \dfrac{1}{Pr(n)}} \times Cbr = br(1) \\[2ex] \dfrac{\dfrac{1}{x_2}}{\dfrac{1}{x_1}+\dfrac{1}{x_2}+\ldots+\dfrac{1}{x_i}+\displaystyle\sum_n \dfrac{1}{Pr(n)}} \times Cbr = br(2) \\[2ex] \vdots \\[1ex] \dfrac{\dfrac{1}{x_i}}{\dfrac{1}{x_1}+\dfrac{1}{x_2}+\ldots+\dfrac{1}{x_i}+\displaystyle\sum_n \dfrac{1}{Pr(n)}} \times Cbr = br(i) \end{array} \right\} \quad \text{(Equation 4)}$$

In Equation 4, Pr(n) is the module priority of the non-specific module "n", Cbr is the bitrate of the corresponding carousel, and br(i) is the bitrate of the specific module "i".

As described above, if specific modules, out of modules included in a carousel, should be sent at predetermined transmission bitrates independently of the transmission bitrates of other non-specific modules, the predetermined transmission bitrates, instead of module priorities, are written for the specific modules in the source information 201. After the rate control unit 110 determines the transmission bitrate of the carousel to which the specific modules belong, the module priorities of the specific modules are calculated. By doing so, specific modules that should be sent at predetermined transmission bitrates, such as source data used to display commercial messages, can be properly sent.

In this embodiment, the transmission bitrates of specific modules are set as predetermined bitrates by calculating priorities of the specific modules according to Equations 3 and 4. However, in the manner described below, the transmission bitrates of the specific modules can be set as the predetermined bitrates without calculating the priorities of the specific modules.

After the rate control unit 100 obtains the transmission bitrate of a source data item (the total bitrate of a carousel), the intra-source rate control unit 108 subtracts the predetermined bitrates of specific modules from the total bitrate to determine the amount of unassigned bitrate, and assigns the unassigned bitrate to other non-specific modules for which priorities are predetermined. The intra-source rate control unit 108 generates a module step table only for the non-specific modules, determines the reading order of the non-specific modules, and sequentially informs the source data reading unit 107 of names of the non-specific modules according to the reading order. The intra-source rate control unit 108 also instructs the source data reading unit 107 to read the specific modules, aside from the non-specific modules.

The source data multiplexing unit 109 generates one data stream for the non-specific modules and generates a plurality of data streams which each correspond to a specific module. That is, if a carousel includes a plurality of specific modules, the source data multiplexing unit 109 generates data streams whose number is equal to "the number of specific modules+ one (for the non-specific modules)".

After the source data multiplexing unit 109 writes the generated data streams into the memory, the data multiplexing unit 111 multiplexes the data streams into the transport stream, as in the first embodiment.

This eliminates the need to convert the predetermined transmission bitrate of each specific module into a priority.

It should be noted here that the embodiments described above may be combined to control the transmission bitrates. Also, the above embodiments may be partially combined to control the transmission bitrates. Example combinations of the embodiments are described below.

FIG. 27 shows schedule information used in the case where the third and fourth embodiments are combined and an initial bitrate is set for each carousel. With this schedule information 2701, the transmission bitrate of each carousel can be controlled according to the corresponding initial bitrate 2702.

The schedule information 2701 may give initial transmission cycles, instead of the initial bitrates 2702. In this case, the transmission bitrate determination processing in the second embodiment is performed and the transmission bitrate of each carousel is controlled according to the corresponding initial transmission cycle.

The bitrate storage unit 103 may hold minimum bitrates, maximum bitrates, and transmission priorities. In this case, the processing in the fifth embodiment is performed and the transmission of each carousel is controlled according to the corresponding minimum bitrate, maximum bitrate, and transmission priority in the transmission schedule.

Minimum transmission cycles and maximum transmission cycles may be used instead of the minimum bitrates and maximum bitrates in the fifth embodiment. In this case, the transmission bitrate determination processing in the fifth embodiment is performed and bitrates are controlled according to the initial transmission cycles, minimum transmission cycles, maximum transmission cycles, and transmission priorities.

An initial transmission cycle, a minimum transmission cycle, a maximum transmission cycle, and a transmission priority may be set for each carousel. Also, the bitrate control processing in the fifth embodiment may be performed without the minimum bitrates or maximum bitrates. In the case where the minimum bitrates are not used, S1508–S1514 in FIG. 15 are performed instead of S2424–S2430 in FIG. 24. In the case where the maximum bitrates are not used, S2408–S2416 in FIG. 24 are omitted.

In each embodiment described above, the total bitrate held in the bitrate storage unit 103 is a fixed value. However, the total bitrate may be changed by an operator or may be adjusted by the bitrate setting unit 104 according to the change in, for instance, video data of broadcast programs. In this case, the transmission bitrate of each source is recalculated, and module priorities are also recalculated as necessary.

In each embodiment, if the transmission bitrate of a source data item becomes "0" or below the corresponding minimum bitrate, the source data item will not be sent. In such a case, a message showing that the source data item cannot be provided may be sent at a low bitrate and displayed to a viewer.

Each embodiment relates to a digital broadcasting apparatus having the construction shown in FIG. 1. However, a program for having a computer achieve the functions of the digital broadcasting apparatus of the present invention may be recorded onto a computer-readable recording medium and used in a digital broadcasting apparatus that does not originally have the functions of the present digital broadcasting apparatus.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A digital broadcasting apparatus that multiplexes a plurality of source data pieces into a transport stream of video and audio data of a broadcast program and transmits the transport stream to a receiving apparatus, the digital broadcasting apparatus comprising:

a source data storage means for storing the plurality of source data pieces;

a bitrate storage means for storing information that shows a bitrate for each source data piece and a total bitrate available for transmitting the plurality of source data pieces;

a transmission period storage means for storing a transmission start time and transmission end time of each source data piece;

a bitrate assigning means for assigning, before the current time reaches each transmission start time and transmission end time in the transmission period storage means, a transmission bitrate to each source data piece according to the information in the bitrate storage means so that a sum of the transmission bitrates is no more than the total bitrate;

a source data reading means for reading, from the source data storage means, each source data piece whose transmission start time matches the current time;

a multiplexing means for (1) holding each source data piece read by the source data reading means between the transmission start time and transmission end time thereof, and (2) repeatedly multiplexing each held source data piece into the transport stream according to the transmission bitrate assigned to the held source data piece; and a transmission means for transmitting the transport stream into which each held source data piece has been multiplexed by the multiplexing means.

2. The digital broadcasting apparatus of claim 1, wherein the bitrate assigning means includes:

a sum calculation unit for calculating a sum of the bitrates for transmission pieces, the transmission pieces being source data pieces to be simultaneously transmitted;

a judging unit for judging whether the sum calculated by the sum calculation unit exceeds the total bitrate;

a first calculation unit for calculating, if a judgement result by the judging unit is negative, the transmission bitrate of each transmission piece according to a first equation, wherein according to the first equation, a certain portion of a difference between the total bitrate and the sum calculated by the sum calculation unit is added to the bitrate for each transmission piece; and a second calculation unit for calculating, if a judgement result by the judging unit is affirmative, the transmission bitrate of each transmission piece according to a second equation, wherein according to the second equation, a certain portion of a difference between the total bitrate and the sum calculated by the sum calculation unit is subtracted from the bitrate for each transmission piece.

3. The digital broadcasting apparatus of claim 2, wherein the bitrate assigning means further includes a recalculation unit for (3) setting at "0" the transmission bitrate of each transmission piece whose transmission bitrate calculated by the second calculation unit was "0" or less and (4) recalculating the transmission bitrates of the other transmission pieces.

4. The digital broadcasting apparatus of claim 3, wherein, instead of each transmission piece whose transmission bitrate was set at "0" by the recalculation unit, the multiplexing means multiplexes message data, that is assigned a low transmission bitrate and shows that transmission of the transmission piece has been canceled, into the transport stream.

5. The digital broadcasting apparatus of claim 2, wherein the bitrate storage means further stores a minimum bitrate and a maximum bitrate of each source data piece, the minimum bitrate of a source data piece being the lowest bitrate at which the receiving apparatus will be able to process the source data piece with sufficient speed, and the maximum bitrate of a source data piece being a bitrate above which no significant gain in speed at processing the source data piece will be able to be achieved for the receiving apparatus, the bitrate assigning means further includes a transmission bitrate recalculation unit that (5), if there is at least one transmission piece whose transmission bitrate calculated by the second calculation unit is below the minimum bitrate thereof, sets the transmission bitrate of the at least one transmission piece at "0" and recalculates the transmission bitrates of the other transmission pieces according to the first equation, and (6), if there is at least one transmission piece whose transmission bitrate calculated by the second calculation unit is above the maximum bitrate thereof, sets the transmission bitrate of the at least one transmission piece as the maximum bitrate and recalculates the transmission bitrates of the other transmission pieces according to the second equation, and the multiplexing means multiplexes each transmission piece into the transport stream according to the transmission bitrates set and recalculated by the transmission bitrate recalculation unit.

6. The digital broadcasting apparatus of claim 5,
wherein, instead of each transmission piece whose transmission bitrate was set at "0" by the recalculation unit, the multiplexing means multiplexes message data, that is assigned a low transmission bitrate and shows that transmission of the transmission piece has been canceled, into the transport stream.

7. The digital broadcasting apparatus of claim 2,
wherein the bitrate for each source data piece in the bitrate storage means matches a minimum bitrate of the source data piece, the minimum bitrate of a source data piece being the lowest bitrate at which the receiving apparatus will be able to process the source data piece with sufficient speed.

8. The digital broadcasting apparatus of claim 1, further comprising
a bitrate changing means for changing the information in the bitrate storage means.

9. The digital broadcasting apparatus of claim 8, further comprising
a warning means for issuing a warning to the outside if a ratio of the sum calculated by the sum calculation unit to the total bitrate exceeds a given threshold.

10. The digital broadcasting apparatus of claim 1,
wherein each source data piece includes a plurality of modules, a priority being assigned to each module, and the source data reading means includes:
a reading order determining unit for determining an order for reading each module of each source data piece according to the priority of the module; and
a module reading unit for reading data of each module in predetermined units according to the determined order.

11. The digital broadcasting apparatus of claim 1, wherein each source data piece includes a plurality of modules, a transmission bitrate being set for each specific module and a priority being assigned to each non-specific module except for the specific module, further comprising
a priority calculation means for calculating a priority of each specific module from the transmission bitrate of a source data piece including the specific module, the transmission bitrate set for the specific module, and the priority assigned to each non-specific module included in the source data piece.

12. The digital broadcasting apparatus of claim 11,
wherein if a source data piece includes one specific module, the priority calculation means calculates the priority of the specific module according to the equation:

$$\frac{\frac{1}{x}}{\frac{1}{x} + \sum_n \frac{1}{\text{PRIORITY OF MODULE } n}} \times \text{CAROUSEL BITRATE} = \text{TRANSMISSION BITRATE OF SPECIFIC MODULE}$$

where x refers to the priority of the specific module and the module n refers to a non-specific module included in the source data piece.

13. The digital broadcasting apparatus of claim 12,
wherein the source data reading means includes:
a reading order determining unit for determining an order for reading each module of each source data piece according to the priority of the module; and
a module reading unit for reading data of each module in predetermined units according to the determined order.

14. The digital broadcasting apparatus of claim 11,
wherein if a source data piece includes a plurality of specific modules, the priority calculation means calculates the priority of each specific module according to the simultaneous equations:

$$\frac{\frac{1}{x_1}}{\frac{1}{x_1} + \frac{1}{x_2} + \ldots + \frac{1}{x_i} + \sum_n \frac{1}{Pr(n)}} \times Cbr = br(1)$$

$$\frac{\frac{1}{x_2}}{\frac{1}{x_1} + \frac{1}{x_2} + \ldots + \frac{1}{x_i} + \sum_n \frac{1}{Pr(n)}} \times Cbr = br(2)$$

$$\vdots$$

$$\frac{\frac{1}{x_i}}{\frac{1}{x_1} + \frac{1}{x_2} + \ldots + \frac{1}{x_i} + \sum_n \frac{1}{Pr(n)}} \times Cbr = br(i)$$

where $x_i$ refers to the priority of a specific module, $Pr(n)$ refers to the priority assigned to a non-specific module included in the source data piece, $Cbr$ refers to the transmission bitrate of the source data piece, and $br(i)$ refers to the transmission bitrate set for the specific module.

15. The digital broadcasting apparatus of claim 1,
wherein each source data piece includes a plurality of modules, a transmission bitrate being set for each specific module and a priority being assigned to each nonspecific module except for the specific module,
the bitrate assigning means includes:
a remaining bitrate assigning unit for obtaining a remaining bitrate by subtracting a sum of the transmission bitrates set for each specific module included in a source data piece from the transmission bitrate of the source data piece and setting a portion of the remaining bitrate as a transmission bitrate of each non-specific module included in the source data piece,
the source data reading means includes:
a first reading unit for reading data of each specific module in predetermined units;
a reading order determining unit for determining an order for reading each non-specific module according to the priority of the non-specific module; and
a second reading unit for reading data of each non-specific module in predetermined units according to the determined order, and
the multiplexing means includes a module data multiplexing unit for (7) multiplexing data of each specific module read by the first reading unit into the transport stream according to the transmission bitrate set for the specific module and (8) multiplexing data of each non-specific module read by the second reading unit into the transport stream according to the transmission bitrate of the non-specific module set by the remaining bitrate assigning unit.

16. The digital broadcasting apparatus of claim 1,
wherein if at least one source data piece that is currently transmitted by the transmission means is updated, the bitrate assigning means reassigns a transmission bitrate to each currently transmitted source data piece according to the information in the bitrate storage means.

17. A digital broadcasting apparatus that multiplexes a plurality of source data pieces into a transport stream of video and audio data of a broadcast program and transmits the transport stream to a receiving apparatus, the digital broadcasting apparatus comprising:

a source data storage means for storing the plurality of source data pieces, each source data piece including at least one carousel which is each repeatedly sent as the source data piece for a predetermined time period;

a bitrate storage means for storing information that shows a bitrate for each carousel and a total bitrate available for transmitting the plurality of source data pieces;

a transmission period storage means for storing a transmission start time and transmission end time of each carousel;

a bitrate assigning means for assigning, before the current time reaches each transmission start time and transmission end time in the transmission period storage means, a transmission bitrate to each carousel according to the information in the bitrate storage means so that a sum of the transmission bitrates is no more than the total bitrate;

a source data reading means for reading, from the source data storage means, each carousel whose transmission start time matches the current time;

a multiplexing means for (9) holding each carousel read by the source data reading means between the transmission start time and transmission end time thereof, and (10) repeatedly multiplexing each held carousel into the transport stream according to the transmission bitrate assigned to the held carousel; and a transmission means for transmitting the transport stream into which each held carousel has been multiplexed by the multiplexing means.

18. The digital broadcasting apparatus of claim 17, wherein the bitrate assigning means includes:

an adding unit for calculating, if a sum of the bitrates for carousels to be simultaneously transmitted is below the total bitrate, the transmission bitrate of each of the carousels by adding a portion of a difference between the sum of the bitrates and the total bitrate to the bitrate for the carousel according to a size of the carousel; and a subtraction unit for calculating, if the sum of the bitrates for the carousels to be simultaneously transmitted exceeds the total bitrate, the transmission bitrate of each of the carousels by subtracting a portion of the difference between the sum of the bitrates and the total bitrate from the bitrate for the carousel according to a reciprocal of the size of the carousel.

19. A digital broadcasting apparatus that multiplexes a plurality of source data pieces into a transport stream of video and audio data of a broadcast program and transmits the transport stream to a receiving apparatus, the digital broadcasting apparatus comprising:

a source data storage means for storing the plurality of source data pieces, each source data piece including at least one carousel which is each repeatedly sent as the source data piece for a predetermined time period;

a bitrate storage means for storing information that shows a transmission cycle for each source data piece and a total bitrate available for transmitting the plurality of source data pieces;

a transmission period storage means for storing a transmission start time and transmission end time of each source data piece, and a transmission time period of each carousel;

a set bitrate calculating means for calculating a set bitrate of each carousel from the transmission cycle of a source data piece including the carousel and a size of the carousel;

a bitrate assigning means for (11) obtaining a transmission start time and transmission end time of each carousel from the information in the transmission period storage means, and (12) assigning, before the current time reaches each transmission start time and transmission end time in the transmission period storage means, a transmission bitrate to each carousel according to the set bitrate calculated for the carousel so that a sum of the transmission bitrates is no more than the total bitrate;

a source data reading means for reading, from the source data storage means, each carousel whose transmission start time matches the current time;

a multiplexing means for (13) holding each carousel read by the source data reading means between the transmission start time and transmission end time thereof, and (14) repeatedly multiplexing each held carousel into the transport stream according to the transmission bitrate assigned to the held carousel; and a transmission means for transmitting the transport stream into which each held carousel has been multiplexed by the multiplexing means.

20. A computer-readable recording medium that records a program and is applied to a digital broadcasting apparatus for multiplexing a plurality of source data pieces into a transport stream of video and audio data of a broadcast program and transmitting the transport stream to a receiving apparatus, the program having a computer of the digital broadcasting apparatus achieve the following means:

a source data storage means for storing the plurality of source data pieces;

a bitrate storage means for storing information that shows a bitrate for each source data piece and a total bitrate available for transmitting the plurality of source data pieces;

a transmission period storage means for storing a transmission start time and transmission end time of each source data piece;

a bitrate assigning means for assigning, before the current time reaches each transmission start time and transmission end time in the transmission period storage means, a transmission bitrate to each source data piece according to the information in the bitrate storage means so that a sum of the transmission bitrates is no more than the total bitrate;

a source data reading means for reading, from the source data storage means, each source data piece whose transmission start time matches the current time;

a multiplexing means for (15) holding each source data piece read by the source data reading means between the transmission start time and transmission end time thereof, and (16) repeatedly multiplexing each held source data piece into the transport stream according to the transmission bitrate assigned to the held source data piece; and a transmission means for transmitting the transport stream into which each held source data piece has been multiplexed by the multiplexing means.

21. A program for achieving the following means:

a source data storage means for storing the plurality of source data pieces;

a bitrate storage means for storing information that shows a bitrate for each source data piece and a total bitrate available for transmitting the plurality of source data pieces;

a transmission period storage means for storing a transmission start time and transmission end time of each source data piece;

a bitrate assigning means for assigning, before the current time reaches each transmission start time and transmission end time in the transmission period storage means, a transmission bitrate to each source data piece according to the information in the bitrate storage means so that a sum of the transmission bitrates is no more than the total bitrate;

a source data reading means for reading, from the source data storage means, each source data piece whose transmission start time matches the current time;

a multiplexing means for (17) holding each source data piece read by the source data reading means between the transmission start time and transmission end time thereof, and (18) repeatedly multiplexing each held source data piece into the transport stream according to the transmission bitrate assigned to the held source data piece; and a transmission means for transmitting the transport stream into which each held source data piece has been multiplexed by the multiplexing means.

* * * * *